S. L. CASELLA.
MACHINE FOR MAKING BATTERY CUPS.
APPLICATION FILED DEC. 23, 1915.

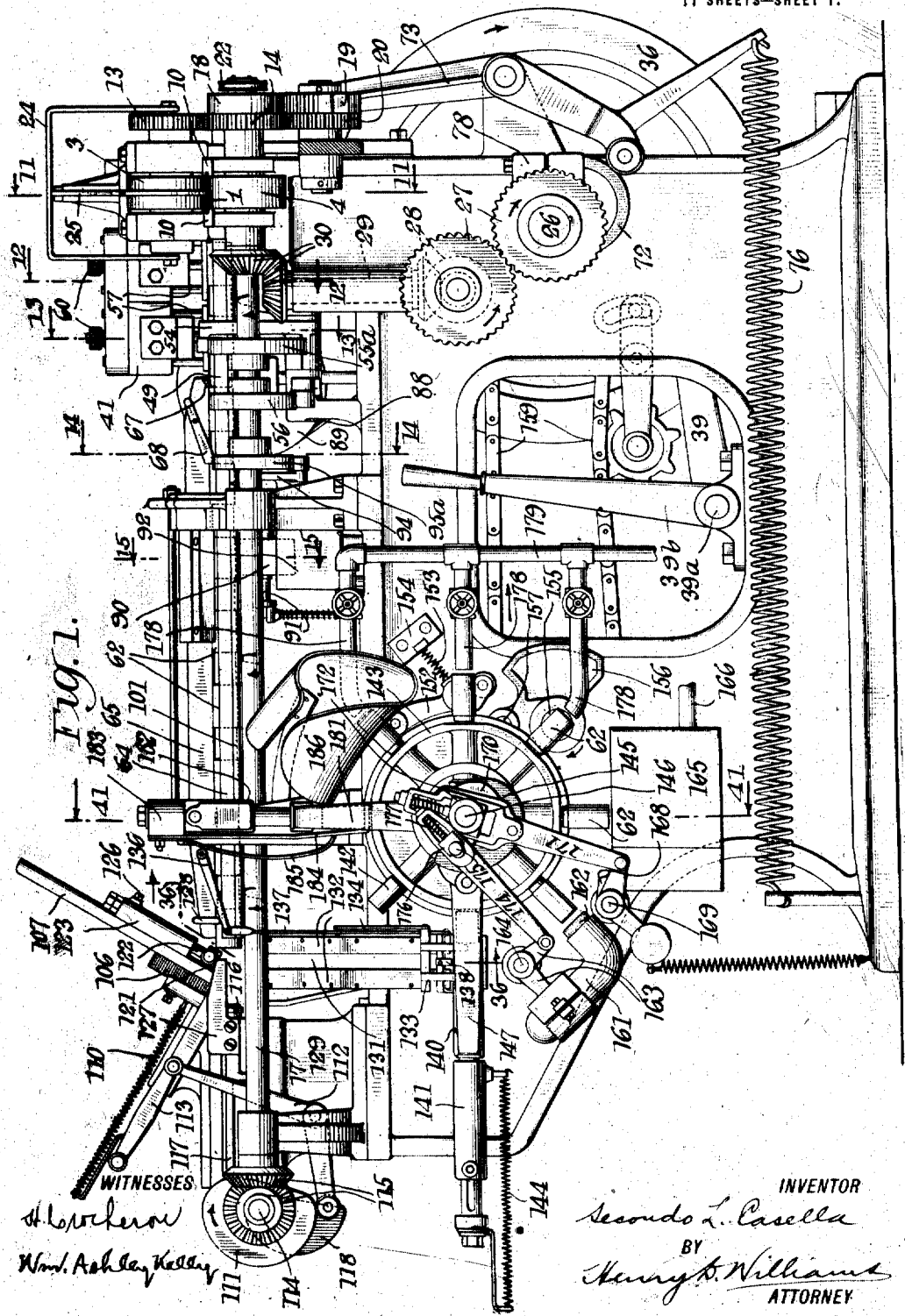

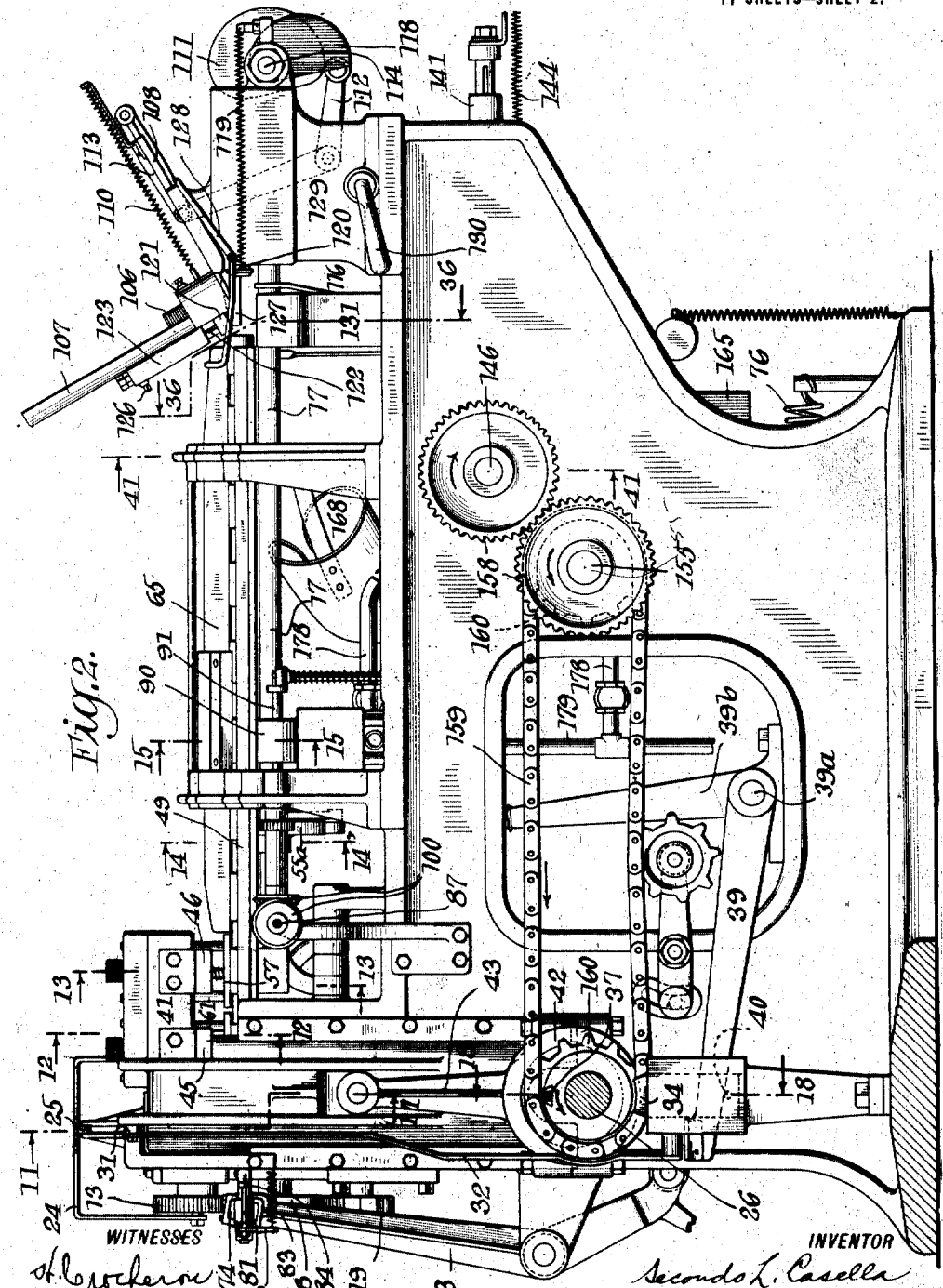

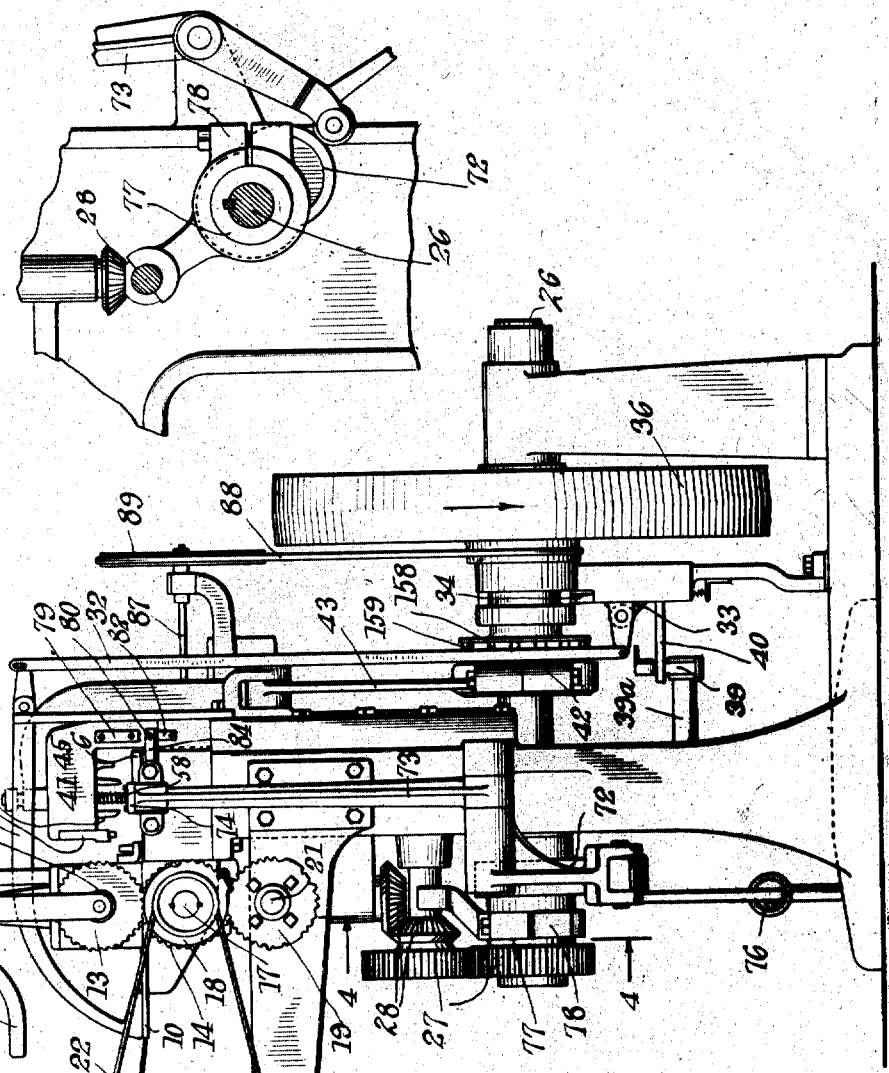

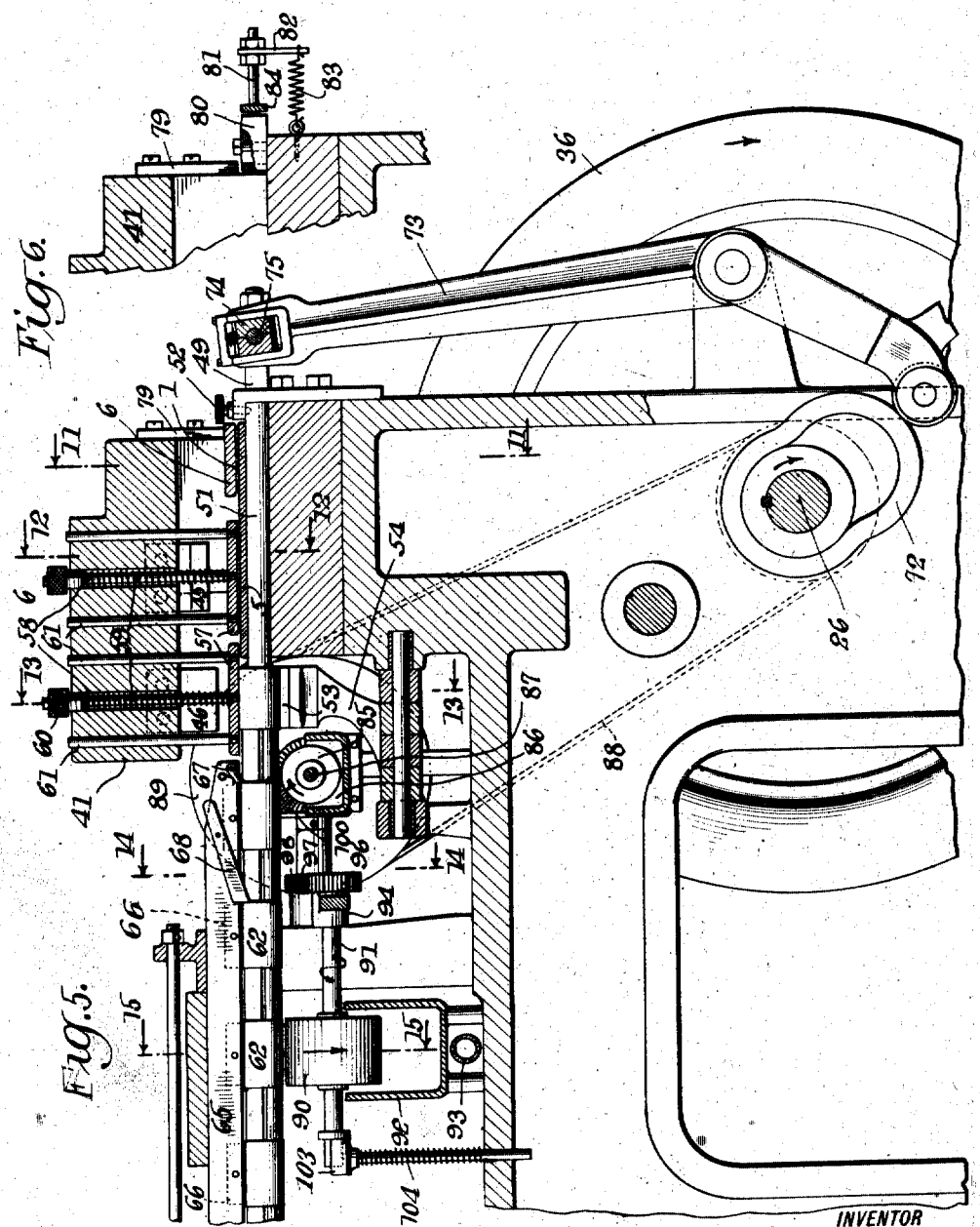

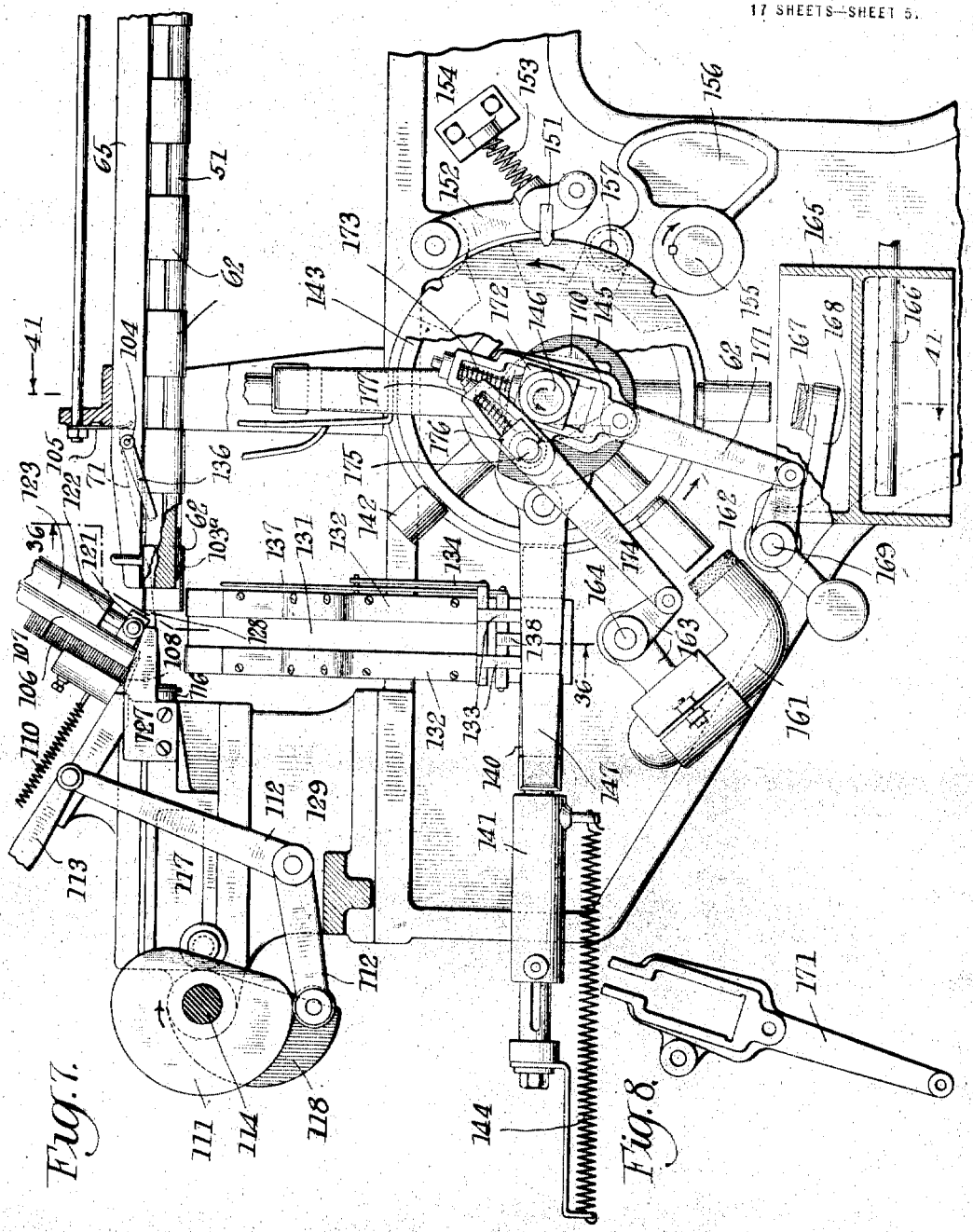

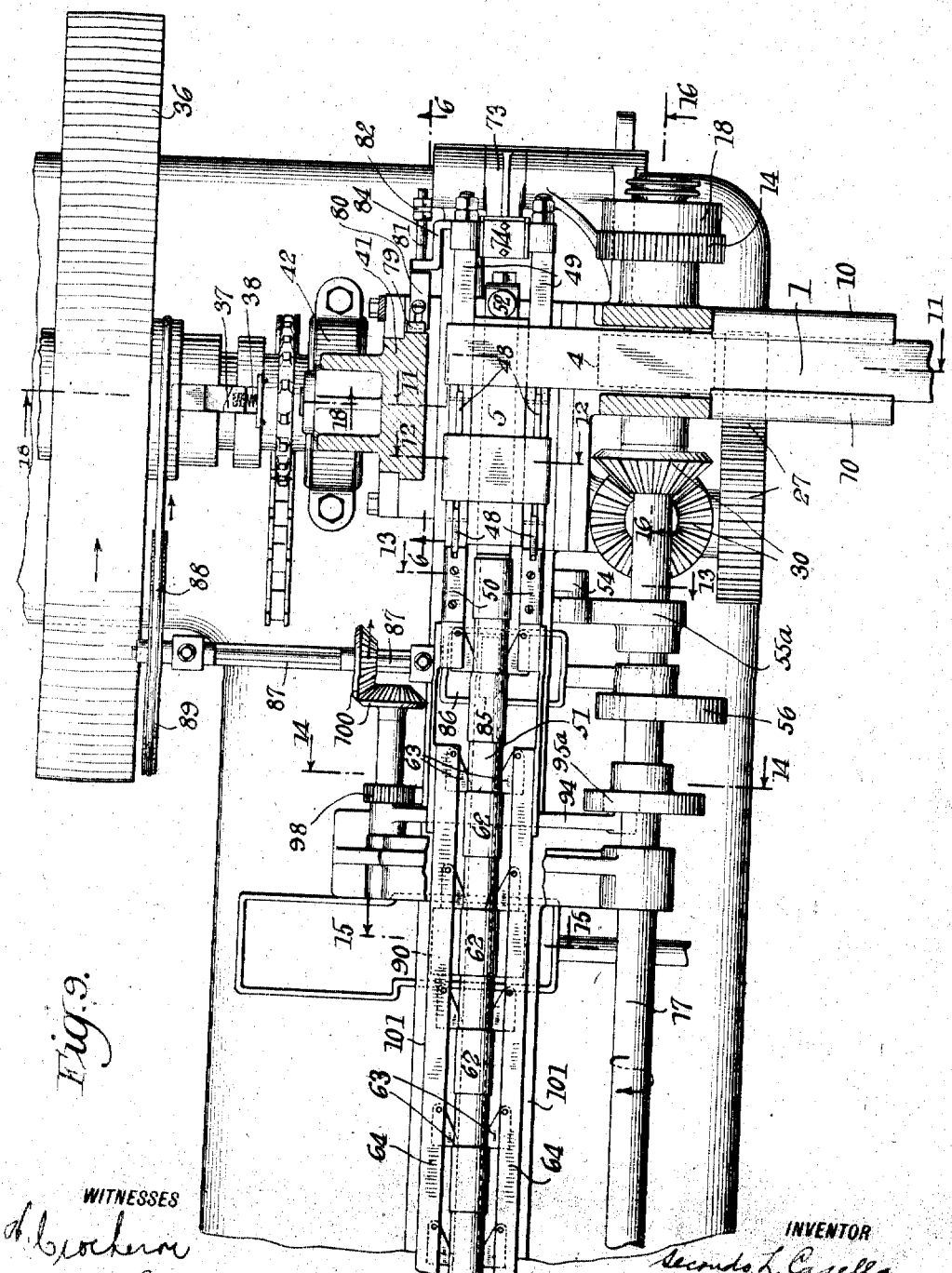

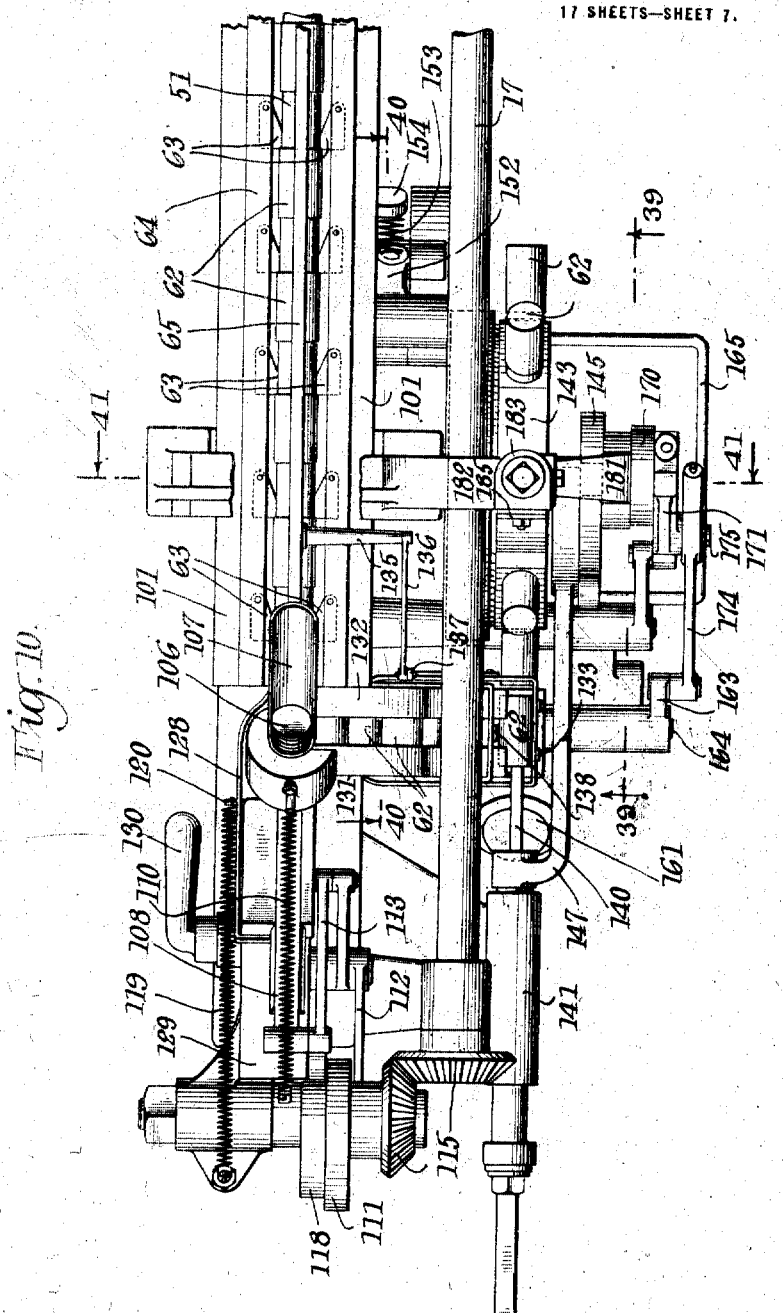

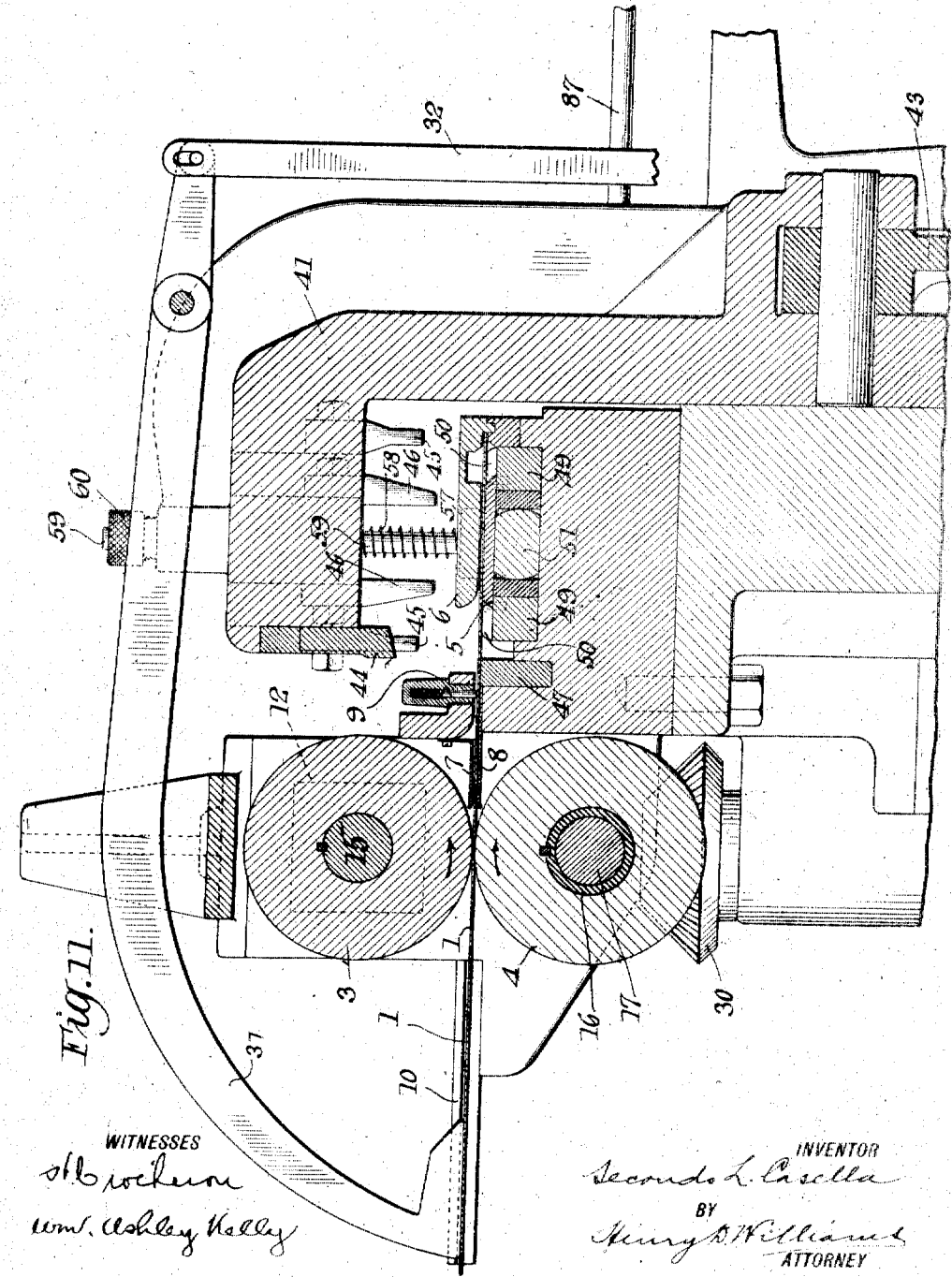

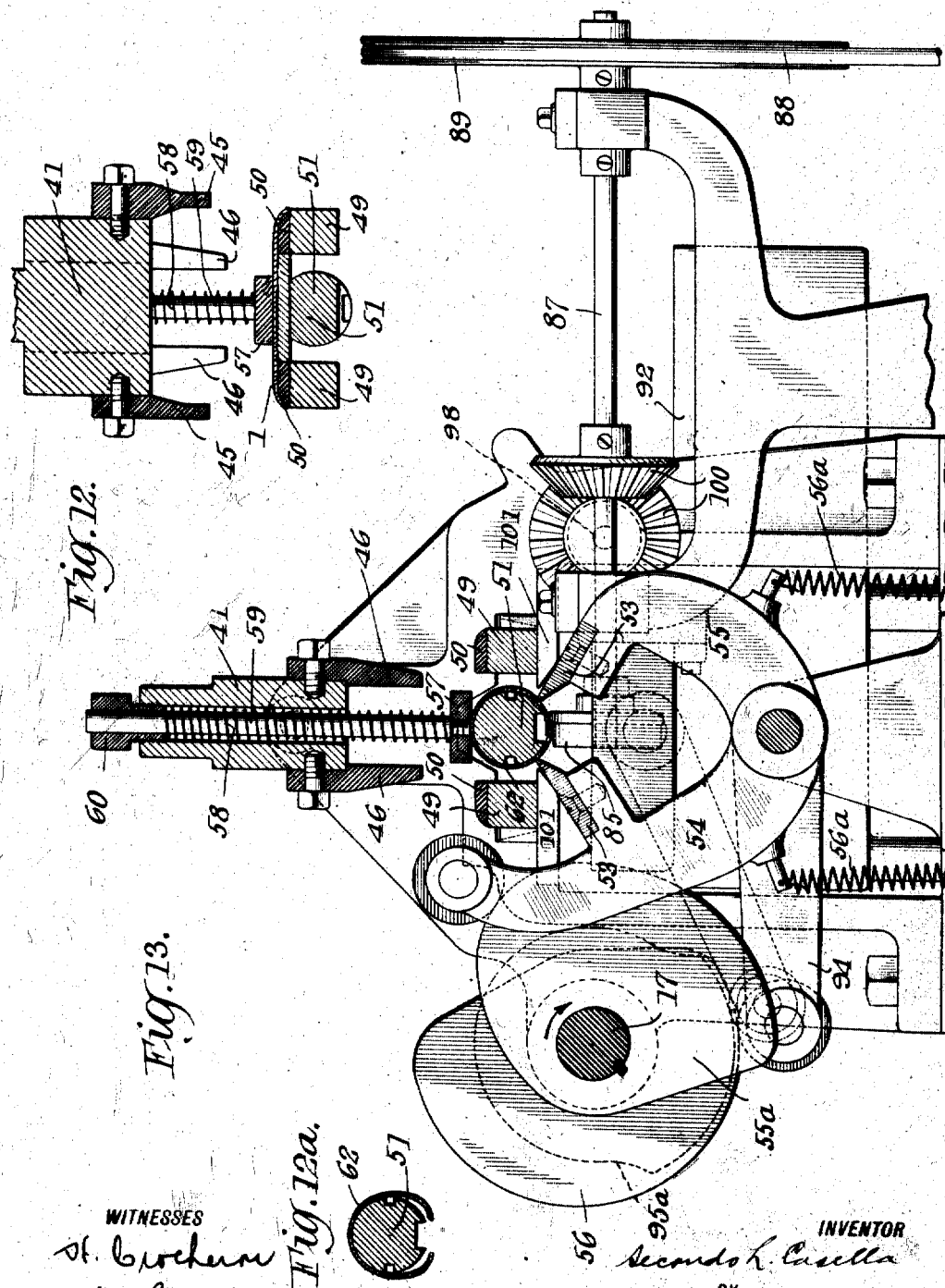

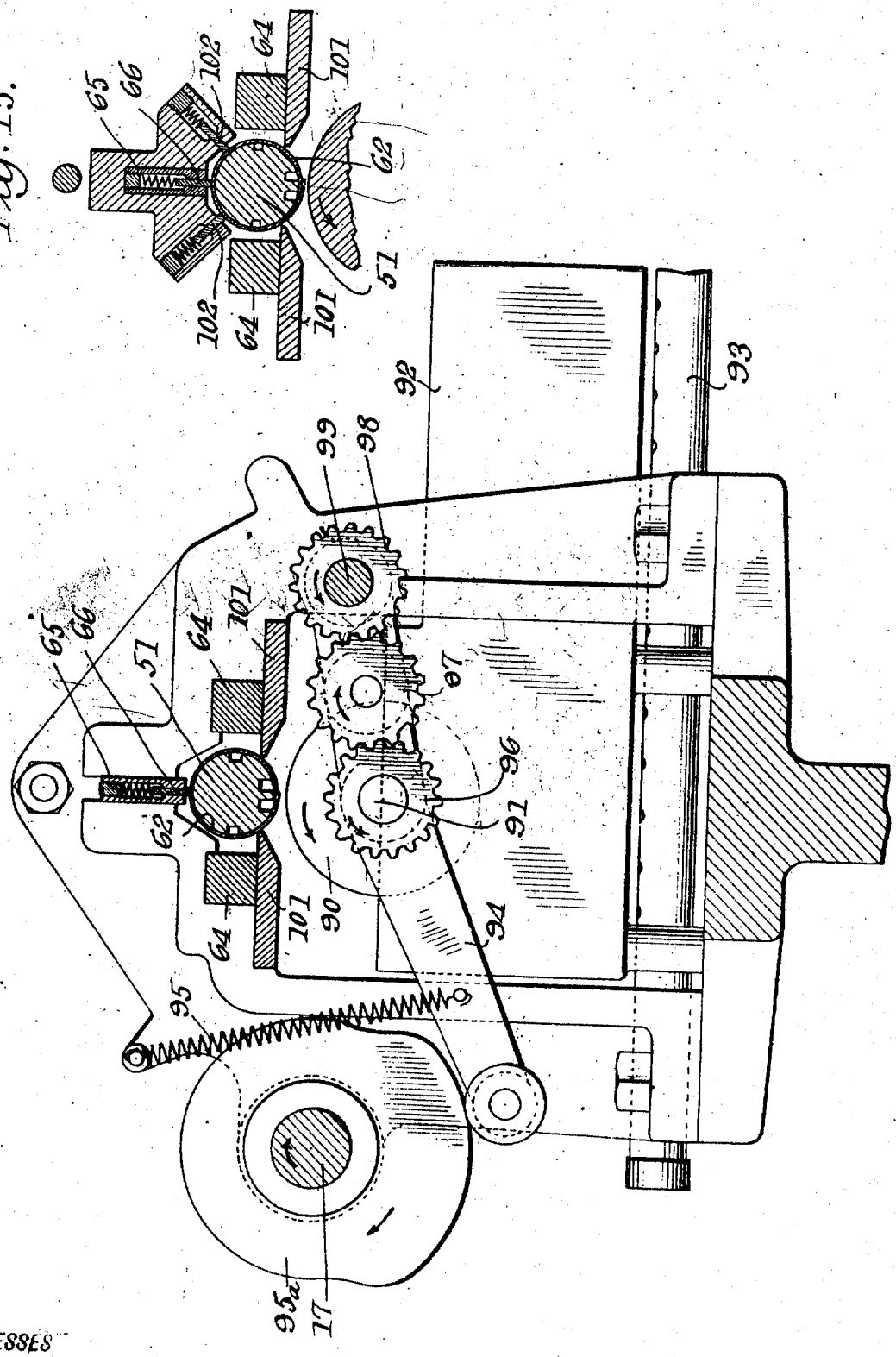

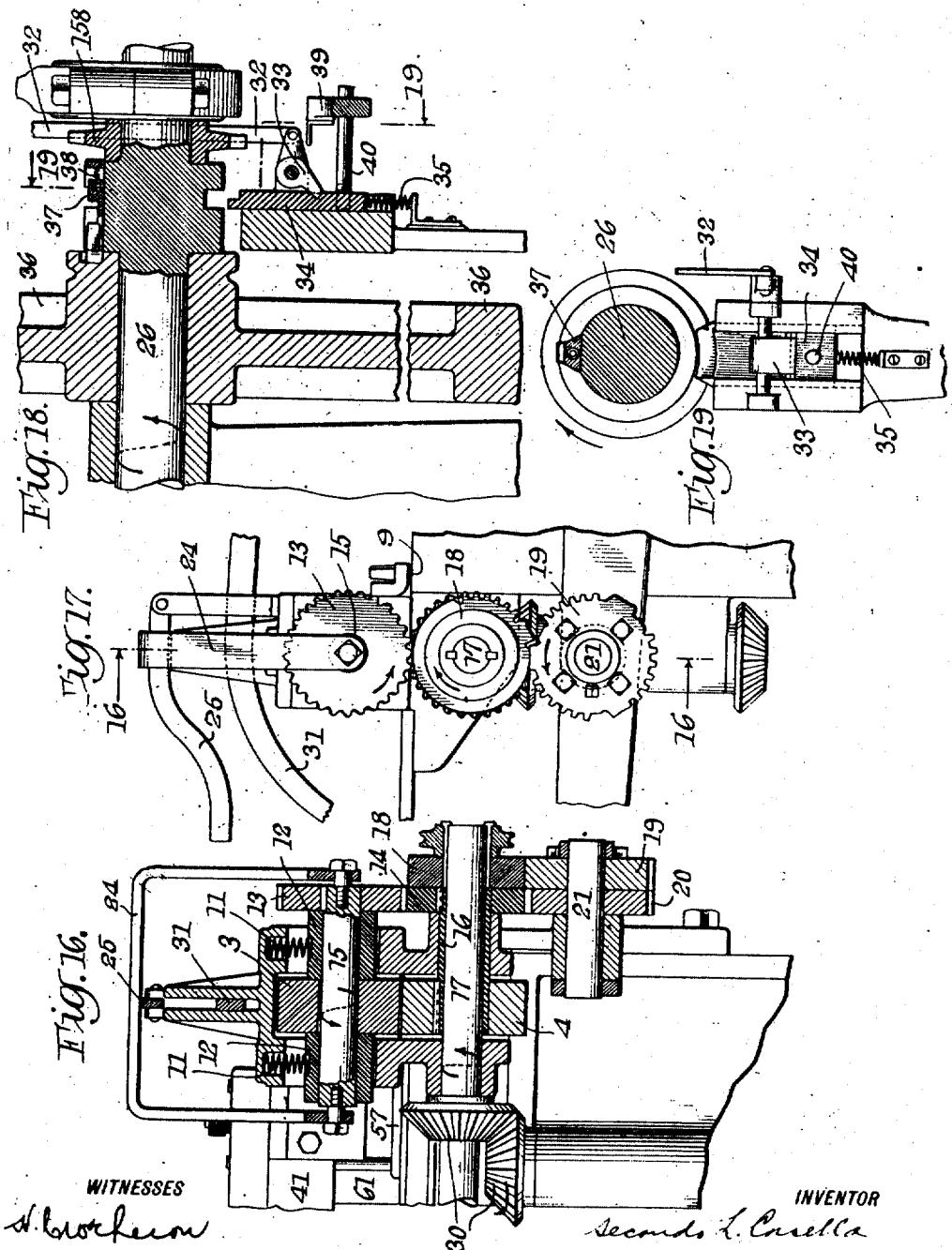

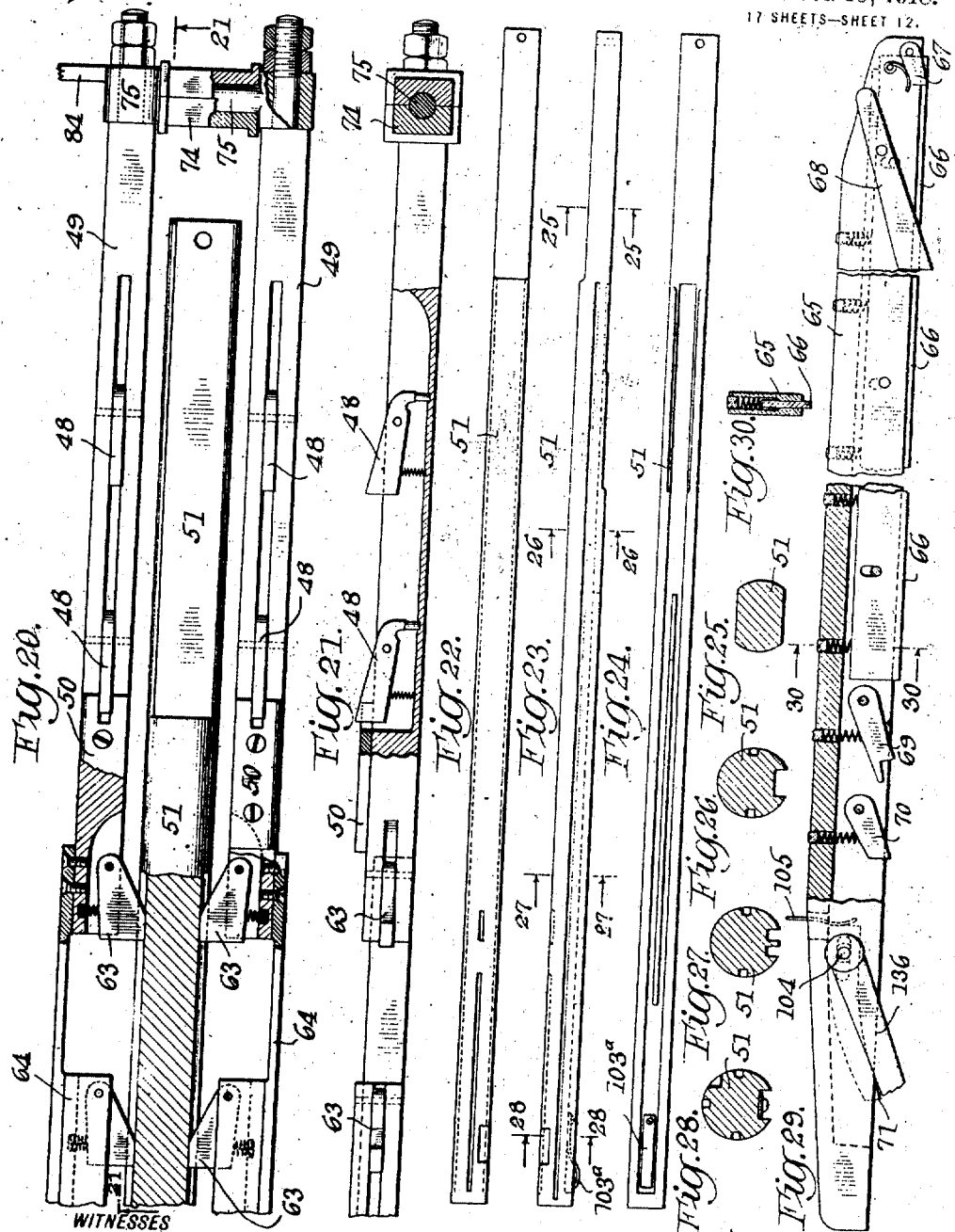

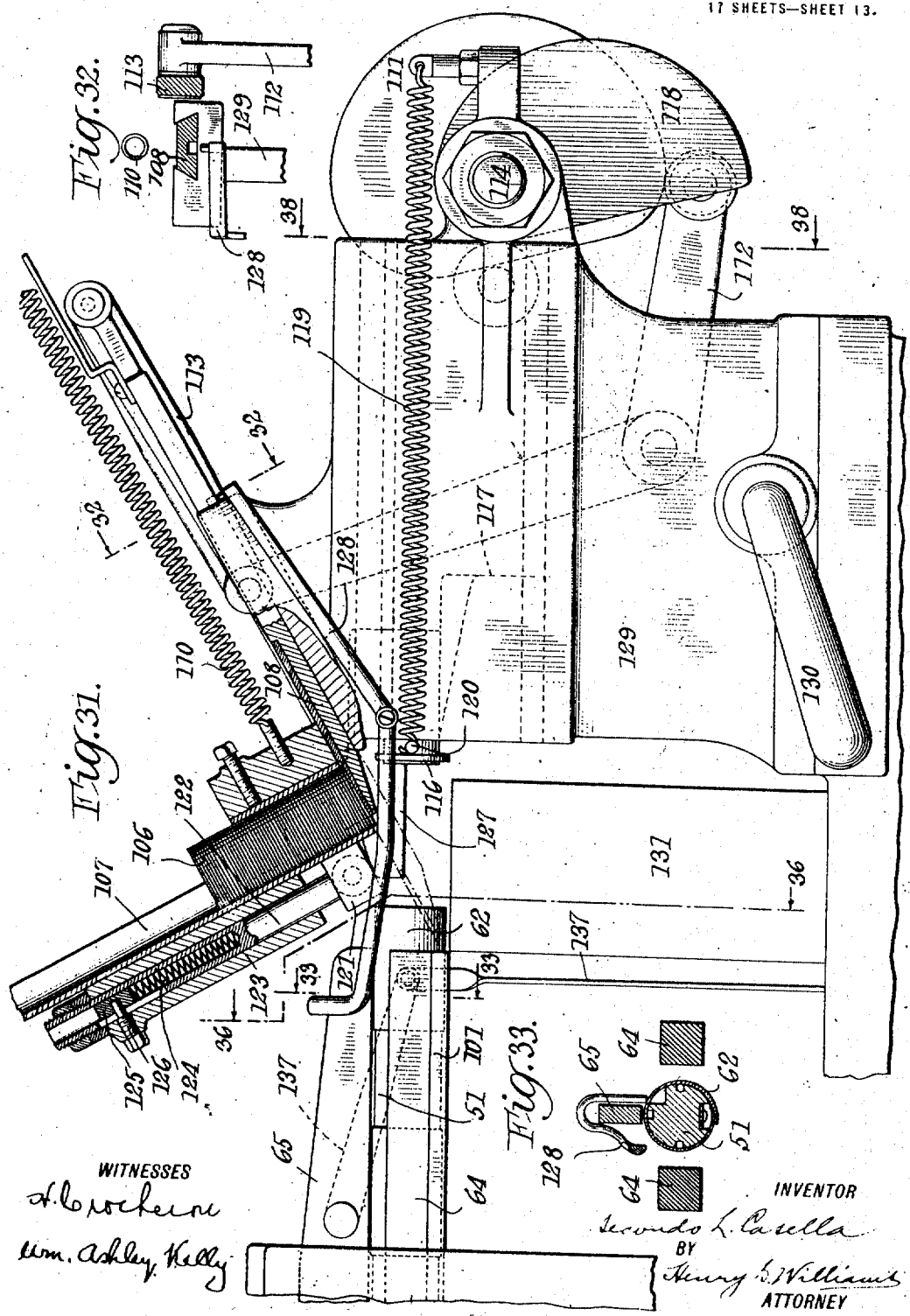

1,281,514.

Patented Oct. 15, 1918.
17 SHEETS—SHEET 14.

WITNESSES

INVENTOR
Samuel L. Casella
BY
Henry D. Williams
ATTORNEY

S. L. CASELLA.
MACHINE FOR MAKING BATTERY CUPS.
APPLICATION FILED DEC. 23, 1915.
1,281,514.
Patented Oct. 15, 19
17 SHEETS—SHEET 1
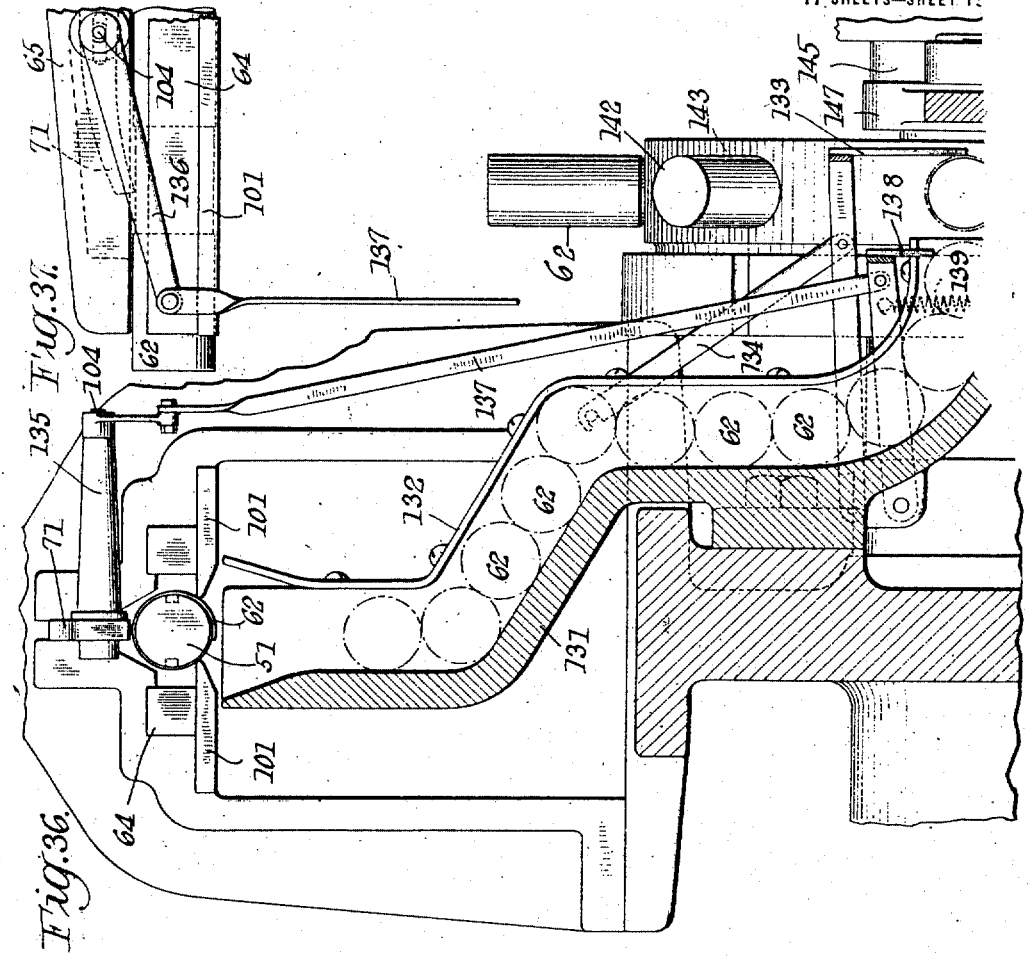
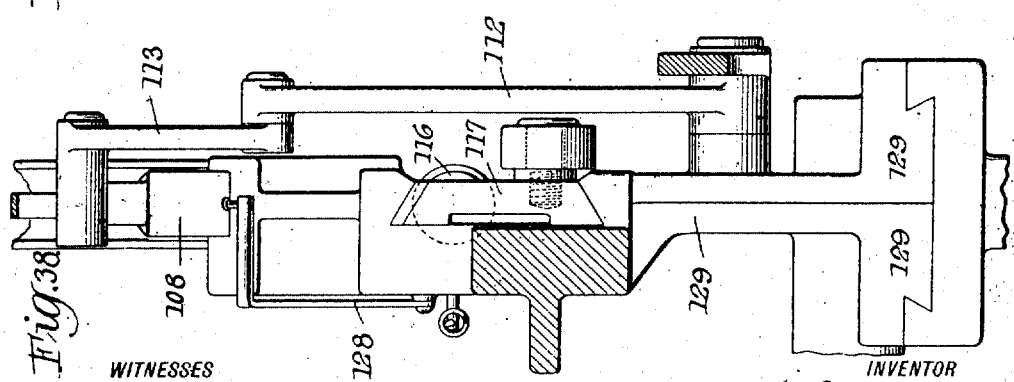

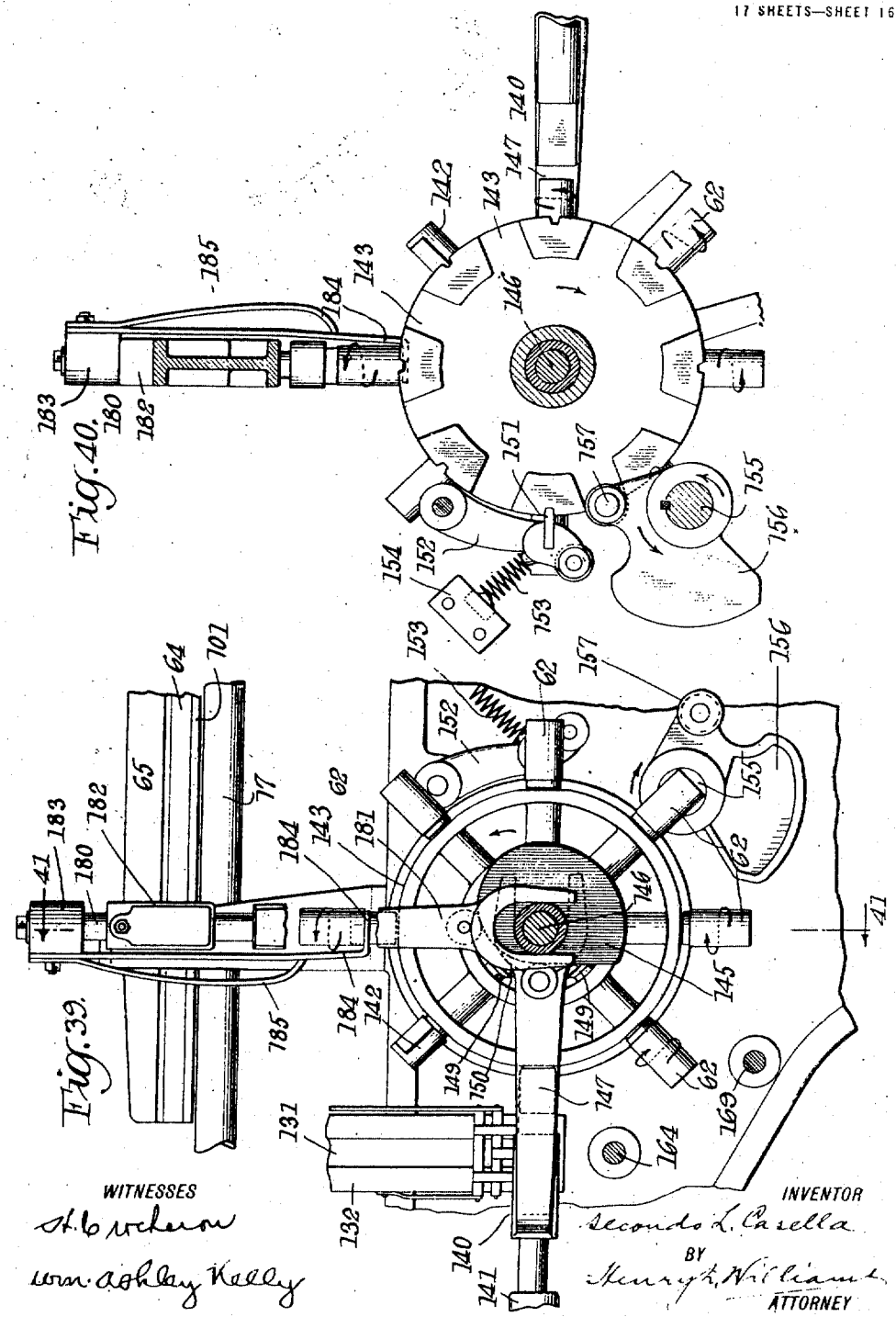

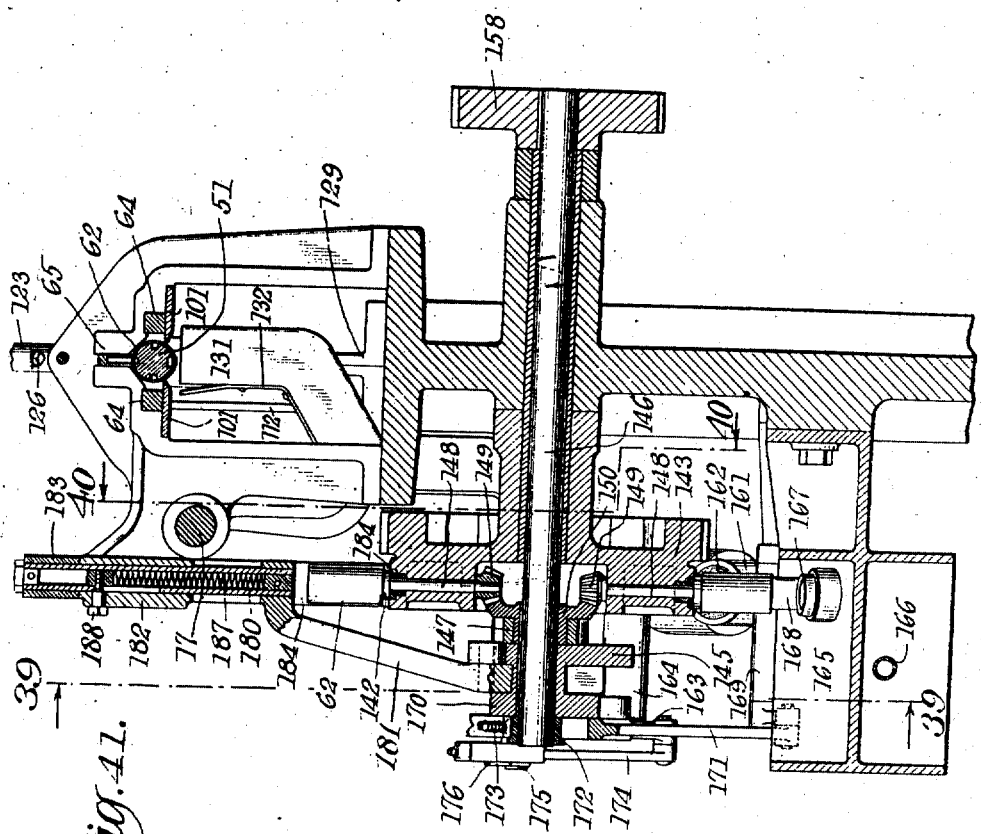

UNITED STATES PATENT OFFICE.

SECONDO L. CASELLA, OF NEW YORK, N. Y., ASSIGNOR, BY MESNE ASSIGNMENTS, TO NATIONAL CARBON COMPANY, INC., A CORPORATION OF NEW YORK.

MACHINE FOR MAKING BATTERY-CUPS.

1,281,514.   Specification of Letters Patent.   Patented Oct. 15, 1918.

Application filed December 23, 1915.   Serial No. 68,391.

*To all whom it may concern:*

Be it known that I, SECONDO L. CASELLA, a citizen of the United States of America, residing at the borough of Manhattan, city of New York, in the county of New York and State of New York, have invented certain new and useful Improvements in Machines for Making Battery-Cups, of which the following is a specification, reference being had therein to the accompanying drawings, forming part thereof.

My invention relates to machines for automatically making the zinc cups or open cans which contain the other elements of usual dry batteries, such cup also constituting the zinc terminal of the battery. These cups are cylindrical with an overlapped soldered seam along one side and a bottom disk soldered in place within one end of the tube, the cup being left open at the top. Heretofore, as a matter of common and extensive practice in the manufacture of batteries, these cups have been made altogether by hand and, so far as I am advised, the machine of my present invention is the first for the purpose of doing this work automatically.

The main object of my invention is to decrease the cost of manufacture of dry batteries by making the zinc cups thereof automatically by machine which have heretofore been made by hand labor. Other objects of my invention are to produce a machine for this purpose which is strong, durable, efficient, dependable, convenient, and comparatively simple in construction and inexpensive of manufacture. Other objects and advantages of my invention will hereinafter appear.

My invention includes features of construction and combinations of parts and subcombinations thereof as will appear from the following description.

I shall now describe the battery cup machine embodying my invention illustrated in the accompanying drawings and shall thereafter point out my invention in claims.

Figure 1 is a front side elevation of a complete battery cup machine embodying my invention with the supply reel omitted, but a part of its supporting bracket being shown.

Fig. 2 is a rear side elevation of the machine with the main drive pulley omitted, its shaft and part of the base of the machine frame being shown in section.

Fig. 3 is an end elevation of the front end of the machine as viewed from the right in Fig. 1 and from the left in Fig. 2.

Fig. 4 is a vertical section on a plane indicated by the line 4—4 of Fig. 3 as viewed from the left, showing the retarding brake on the main shaft.

Fig. 5 is an enlarged central longitudinal vertical section of the front end of the machine as viewed from the front side thereof with parts in elevation and other parts omitted.

Fig. 6 is a partial section on a plane indicated by the line 6—6 of Fig. 9 as viewed from below and shows one of the safety devices.

Fig. 7 is a front side elevation with parts in section of the rear end of the machine.

Fig. 8 is an elevation with the upper end broken away, of the operating rod of the bottom soldering device appearing in Fig. 7.

Fig. 9 is a plan view with parts omitted of the front end of the machine appearing in Fig. 5.

Fig. 10 is a similar view of the rear end of the machine appearing in Fig. 7.

Figure 34:
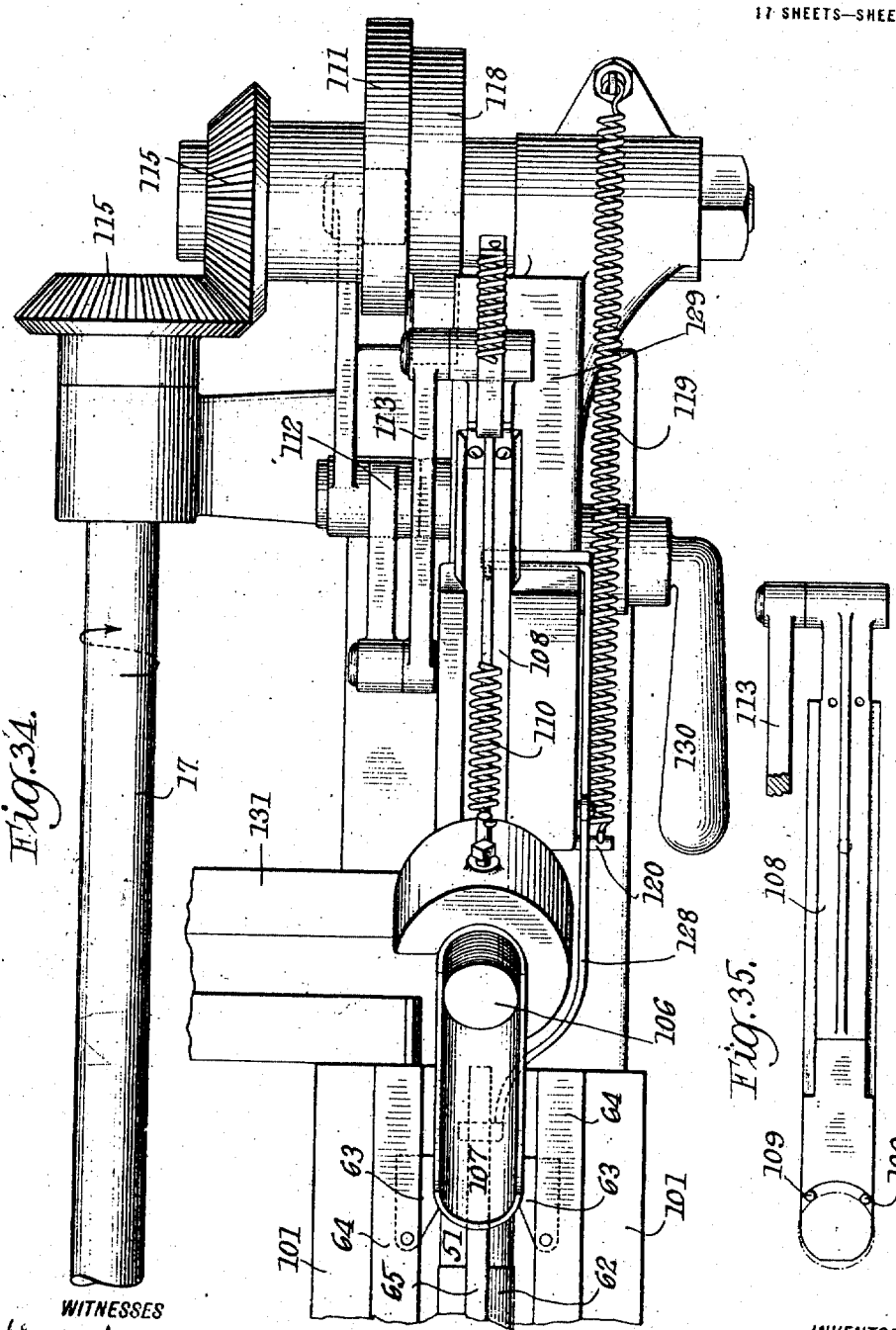

Fig. 11 is an enlarged vertical transverse section of the upper part of the machine on a plane indicated by the line 11—11 of Figs. 1, 2, 5 and 9 as viewed from the right in Figs. 1, 5 and 9 and from the left in Fig. 2.

Fig. 12 is an enlarged partial transverse vertical section of the upper part of the machine on a plane indicated by the line 12—12 of Figs. 1, 2, 5 and 9 as viewed from the right in Figs. 1, 5 and 9 and from the left in Fig. 2, showing the first pair of formers and their immediate adjuncts.

Fig. 12ª is a partial section on the same plane as Fig. 13 but showing a preceding phase of operation.

Fig. 13 is a transverse vertical section of the upper part of the machine on a plane indicated by the line 13—13 of Figs. 1, 2, 5 and 9 as viewed from the right in Figs. 1, 5 and 9 and from the left in Fig. 2 with parts in elevation and shows the second and third pairs of formers and other parts.

Fig. 14 is a similar section indicated by the line 14—14, showing the soldering means.

Fig. 15 is a similar section indicated by the line 15—15, at the soldering wheel, and shows the holding devices for the soldered body tube of the cup.

Fig. 16 is a vertical longitudinal section through the feed rolls on a plane indicated by the line 16—16 of Figs. 9 and 17 as viewed from below in Fig. 9 and from the left in Fig. 17.

Fig. 17 is an elevation as viewed from the right in Fig. 16.

Fig. 18 is a partial vertical section on a plane indicated by the line 18—18 of Figs. 2 and 9 as viewed from the right in Fig. 2 and from the left in Fig. 9, showing the clutch and its automatic operating means.

Fig. 19 is a vertical section on a plane indicated by the line 19—19 of Fig. 18 as viewed from the right.

Fig. 20 is a plan view partly in section of the front ends of the horn and feed bars for feeding forward the body blanks and tubes formed therefrom.

Fig. 21 is a vertical section with parts broken away, the section being taken on a plane indicated by the line 21—21 of Fig. 20 as viewed from below.

Fig. 22 is a plan view of the tube-supporting and guiding horn drawn to a smaller scale than Figs. 20 and 21.

Fig. 23 is a side elevation of the same as viewed from below in Fig. 22.

Fig. 24 is an inverted plan view of the horn.

Figs. 25, 26, 27 and 28 are transverse sections of the horn on planes indicated by corresponding lines of Fig. 23, as viewed from the left and looking toward the front end of the machine.

Fig. 29 is a side elevation partly in section and with parts omitted of the body blank and tube-holding rail and its immediate adjuncts.

Fig. 30 is a transverse vertical section on a plane indicated by the line 30—30 of Fig. 29 as viewed from the left.

Fig. 31 is a view similar to Fig. 7, but further enlarged, looking from the other side or rear of the machine.

Fig. 32 is a diagonal section on a plane indicated by the line 32—32 of Fig. 31 as viewed from the right and downward.

Fig. 33 is a vertical transverse section on a plane indicated by the line 33—33 of Fig. 31 as viewed from the right.

Fig. 34 is a plan view of what appears in Fig. 31.

Figure 35:
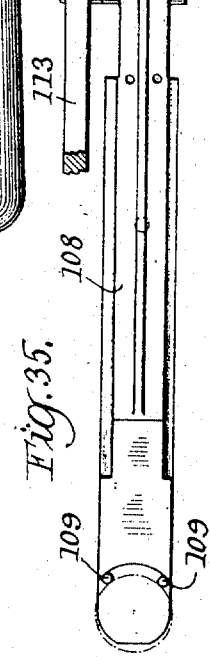

Fig. 35 is a plan view of the bottom blank feed blade as isolated from Fig. 34.

Fig. 36 is a transverse vertical section of the upper part of the machine on a plane indicated by the line 36—36 of Figs. 1, 2, 6, 7 and 31 drawn to the scale of Fig. 31 and looking toward the front end of the machine, as viewed from the left in Figs. 1 and 7 and from the right in Figs. 2 and 31.

Fig. 37 is an elevation of what appears in the upper part of Fig. 36 as viewed from the right.

Fig. 38 is a transverse vertical section on a plane indicated by the line 38—38 of Fig. 31 as viewed from the right.

Fig. 39 is a vertical section longitudinally of the machine on a plane indicated by the line 39—39 of Fig. 10 as viewed from below and of Fig. 41 as viewed from the left and shows details of the turret and its adjuncts in a slightly different phase of operation as compared with the other figures of the drawings.

Fig. 40 is a partial vertical section longitudinally of the machine on a plane indicated by the line 40—40 of Fig. 10 as viewed from the rear and of Fig. 41 as viewed from the right, showing further details of construction of the turret and its adjuncts, the phase of operation being the same as appears in Figs. 1 and 7, for example.

Fig. 41 is a transverse vertical section of the machine as viewed from the front end thereof on a plane indicated by the line 41—41 of Figs. 1, 2, 7, 10 and 39, the view being from the left in Fig. 2 and from the right in the other figures.

It is to be noted and taken into consideration that the sheet zinc from which battery cups are made is quite pliable and is not sufficiently rigid and strong to permit of hooked or clenched joints such as are commonly employed in tin cans. For this reason the soldering of the joints must be relied upon altogether, the side seam of the cup body being a simple lapped joint and the bottom disk being held in place at the inside of the body tube altogether by solder. Moreover, while by far the largest number of battery cups are of comparatively small size the nature of zinc is such that these cups cannot be formed by drawing operations as this would leave them cracked, porous and worthless as containing cells for batteries. Therefore in providing an automatic machine for doing this work of making zinc battery cups, special requirements must be kept in mind, and the machine for this purpose now to be described produces zinc battery cups of substantially the same construction that were formerly made by hand. One of the most common sizes of these battery cups is about two and one-quarter inches in length by one and one-quarter inches in diameter. That is the size of cups produced by the machine illustrated in the accompanying drawings, although it is to be understood that similar automatic machines embodying my invention may be constructed for producing either larger or smaller sized cups, and in fact a similar machine has been built for producing cups of a smaller size than that mentioned.

In the machine embodying my invention illustrated in the drawings, a strip of sheet zinc 1 of a width corresponding to the depth of the battery cups to be produced is taken from a supply reel 2 and is pushed by feed rollers 3 and 4 between a lower bed plate 5 and an upper guide plate 6, the latter being shown as provided at the back with an abutment flange. The bed plate 5 and guide plate 6 are both rigidly mounted and are spaced apart a trifle more than the thickness of the sheet metal strip 1 and are rounded at their adjacent forward edges for the easy admission of the end of the strip 1 between them, as clearly appears in the drawings, particularly in Fig. 11. In the space or gap between the feed rollers 3 and 4 and the slightly spaced guide plates 5 and 6 the sheet metal strip 1 is guided by means of thin guide plates 7 and 8 and is pressed down upon the latter by a spring-pressed pin 9. Grooved guide bars 10 support the zinc strip 1 at its edges and guide it to the feed rollers 3 and 4. The upper feed roller 3 is strongly spring-pressed toward the lower one 4 by means of a pair of coiled thrust springs 11 acting upon guide blocks 12 slidably mounted in the frame of the machine, as appears in Fig. 16 for example. The feed rollers 3 and 4 are geared together for concurrent actuation by means of spur gears 13 and 14, the former being fixed upon a shaft 15 which carries the upper feed roller 3 and the latter being fixed upon a sleeve 16 which carries the lower feed roller 4. The sleeve 16 is journaled both in the frame of the machine and upon a longitudinal shaft 17 extended substantially from end to end of the machine, as clearly appears in Fig. 1. The feed rollers 3 and 4 are intermittently positively operated by means now to be described.

Gears and a Geneva movement are provided for positively driving the lower feed roller 4 from the longitudinal shaft 17. A mutilated gear 18, constituting the driving element of the Geneva movement, is fixed on the outer end of the shaft 17 adjacent to the spur gear 14 of the lower feed roller 4, and intermittently actuates in a well known manner an intermittent gear 19 constituting the driven element of the Geneva movement. In the construction shown the driving element 18 imparts one-third of a rotation to the driven element 19 for each rotation of the shaft 17, so that it will require three rotations of the shaft 17 and driving element 18 to impart one complete rotation to the driven element 19, the rotation of the latter being intermittent with intervening periods of rest as is well understood. The driven element 19 of the Geneva movement is bolted to the spur gear 20 as clearly appears in the drawings, particularly in Figs. 16 and 17, and both of the gears 19 and 20 are fixed upon a stub-shaft 21 which is journaled in the frame of the machine, Fig. 16 particularly, and the spur gear 20 meshes with the gear 14 of the lower feed roller 4. It will now be understood that the strip of sheet zinc 1 will be intermittently positively fed rearward over the bed plate 5 and beneath the guide plate 6 for providing at proper intervals blanks from which the cup bodies or tubes are formed.

The supply reel 2 is driven in the forward or unwinding direction by means of a small belt 22 which passes over a small pulley on the outer end of the shaft 17 and around a larger pulley 23 fixed on the shaft of the reel 2. The purpose of this is to provide a certain amount of slack in the strip 1 for lessening the strain on the feed rollers 3 and 4 so that a positive feeding forward of the strip 1 will be assured. The reel 2 is turned forward a little faster than is necessary and occasionally is turned backward by hand to take up the slack when it becomes too much in the strip 1. A yoke 24 pivoted to the ends of the upper feed roller shaft 15 and a forwardly projecting lever 25 pivoted on the frame of the machine are provided for raising the upper feed roller 3 against the tension of the springs 11 when this becomes necessary for any purpose in the operation of the machine.

Means are provided for automatically stopping the machine should the supply of sheet zinc strip 1 on the reel 2 become exhausted, as will now be described. A main drive shaft 26 is journaled in and extends transversely through the frame of the machine at the front end thereof and at the front side of the machine is connected to the longitudinal shaft 17 to drive the latter by means of intermediate connections including spur gears 27, bevel gears 28, a short vertical shaft 29 and upper bevel gears 30. A weighted trigger lever 31 is pivoted on the frame of the machine and left free at its forward end and is supported by the strip of zinc 1 so that in the absence of the zinc strip 1 the lever end will drop between the side guides 10. The rear and shorter end of the trigger lever 31 is connected by means of a long link 32 to a pivoted pawl 33 supported by a part of the frame of the machine beneath the main drive shaft 26. The pivoted pawl 33 controls a slidable clutch-disengaging wedge 34 and normally holds this wedge at its disengaged or non-operative position, the wedge 34 being pressed toward its operating position by a coiled thrust spring 35, all of which appears most clearly in Fig. 18.

A main drive pulley 36 is freely or loosely mounted on the main drive shaft 26 between a boss formed thereon and an outer bearing therefor forming a part of the frame of the machine, as clearly appears in Figs. 3 and 18. The hub of the drive-wheel 36 has therein a clutch-receiving recess as appears in the drawings and the boss of the drive shaft 26 has an undercut or dovetailed clutch-receiving groove longitudinally therein. A clutch member 37 is slidably mounted in the groove of the boss and a coiled thrust spring 38 is back of and presses the clutch member 37 in toward the hub of the drive wheel 36 and into coöperative engagement with the clutch-receiving recess therein. The boss on the drive shaft 26 is also provided with an annular groove which intersects the longitudinal clutch-receiving groove, and the clutch member 37 on its outer side is notched transversely so as to provide an inclined shoulder, see Fig. 9, which when the clutch is engaged lies in the annular groove in position to be engaged by the clutch-releasing wedge 34 when the latter is in its uppermost position but being free therefrom when the latter is withdrawn to its lower position where it is held by the pawl 33, as appears in the drawings, particularly Fig. 18. It will now be understood that should the free weighted end of the trigger lever 31, drop by reason of the zinc strip 1 running out, it would lift the link 32 and disengage the pawl 33 from the clutch-disengaging slide 34 whereupon the latter will be raised by the spring 35 to the clutch-releasing position and will actuate the clutch-member 27 so as to withdraw it from the recess in the hub of the drive wheel 36, thereby stopping the entire machine, the drive wheel 36 only continuing to rotate.

It may as well be noted here that the clutch mechanism just described may also be manually actuated to start or stop the machine when desired. For this purpose a clutch-controlling lever 39 extends at its free end beneath the outer arm of the clutch-controlling pawl 33 and above a pin or stud 40 which rigidly projects from the slidable wedge 34, the end of the lever 39 having some lost motion between the parts 33 and 40 to provide for the independent automatic clutch actuation just described. When the free end of the lever 39 is raised to disengage the pawl 33 from the slidable wedge 34 the clutch member 37 will be disengaged in the same way as above described for stopping the machine. If the lever end 39 is lowered it will press upon the stud 40 and will withdraw the slidable clutch-disengaging wedge 34 so that the clutch member 37 may be moved to the engaging position by the spring 38 and the pawl 33 will hold the clutch operating wedge 34 at its non-operative position, the pawl 33 being pressed to its engaging position by the weight of the link 32 which has a slightly slotted connection at its upper end with the rear end of the weighted trigger lever 31, as appears in Figs. 3 and 11. The lever 39 is fixed on the rock shaft 39ª which extends to the front of the machine frame and is provided at the front of the machine with a hand lever 39ᵇ.

The means or devices for cutting blanks from the end of the sheet metal strip 1 and forming them into tubular cup bodies will now be described. A strong L-shaped head 41 overhangs the top of the front end of the machine and is vertically slidable in guideways at the rear side of the machine. The head 41 is reciprocated directly from the main drive shaft 26 by means of an eccentric 42 and connecting rod 43. The upper overhanging portion of the head 41 has rigidly or fixedly mounted thereon to move therewith a shearing jaw 44, a first pair of widely spaced forming jaws 45, and a second pair of less widely spaced forming jaws 46, so that a shearing operation and two separate forming operations will all be performed at the same time upon three separate blanks at each time that the head 41 descends. The movable shearing jaw 44 coöperates with a stationary shearing jaw 47 to cut blanks from the end of the sheet zinc strip 1. As the body blanks are cut from the end of the strip 1, they are fed in a direction at right angles to the previous feed successively into register with the first and second pairs of formers 45 and 46 by means of two pairs of spring-pressed pawls 48 which project upwardly from the forward portion of two reciprocated feed bar sections 49 located below the level of and at opposite sides of the bed plate 5. The first pair of formers 45 coöperates with a pair of former plates 50 shown as mounted upon the upper side of the feed bar sections 49 by means of screws, these former plates 50 being provided with rounded outer edges at the top. The first pair of formers 45 coöperate with the rounded outer edges of the former plates 50 to turn down the end portions of the body blank on a curve which is shorter than that of the circumferential curve of the complete cylindrical tube of the cup body, thereby assuring a smooth overlapped joint without a projecting ridge in the body tube and in the completed cup. The result of the operation of the first pair of formers 45 may be seen in Figs. 9 and 12, particularly the latter. The second pair of formers 46, when they descend with the head 41 on which they are fixedly or rigidly mounted, bend the body blank at its middle and outwardly therefrom around a stationary horn 51 but without closing the edges of the blank completely together, the shape of the blank after this second forming operation being shown in Fig. 12ª. The horn 51 is cylindrical in its working portion, is stationary and projects from the front end of the machine nearly to the rear end thereof and is rigidly mounted in the frame of the machine at its front end. Ready removal of this horn is provided for by means of a clamp screw 52, as appears most clearly at the right in Fig. 5.

A third forming operation is performed by a pair of oppositely moving gripping jaws 53, see Fig. 13 particularly, which close together the inturned edges of the blank in close overlapping relation to form a tube surrounding the horn, as clearly appears in Fig. 13. The gripping jaws 53 are carried respectively by concentrically pivoted operating levers 54 and 55 which are respectively operated by cams 55ª and 56 fixed on the longitudinal shaft 17, these levers being retracted by stretched coil springs 56ª. It has hereinbefore been noted that the shearing operation and the first and second forming operations all take place at the same time at different locations on different blanks. It should now be noted that the third forming operation performed by the jaws 53 takes place at the same location in the travel of the blank as the second forming operation performed by the forming jaws 46, but in properly timed relation so that the third forming operation follows the second forming operation during one interval of rest of the blank at this location, as clearly appears in the drawings, for example in Figs. 5 and 13.

During the forming operations the blanks are firmly held down upon the bed plate 5 and upon the horn 51 by means of pressure plates 57 which are pressed downward by coiled thrust springs 58 which are received in bores in the head 41 and these springs are held in place and guided by pins 59 which project upward above the head 41 through abutment screws 60 for the springs 58. The pressure plates 57 are also provided with guide pins 61 which pass upward through and are guided in the head 41. It will be noted that the reciprocating movement of the head 41 causes the pressure plates 57 to exert their greatest pressure during the forming operation and particularly during the operation of the first and second pairs of formers 45 and 46. The pressure plates 57 also prevent retrograde movement of the blanks when the feed pawls 48 are moved toward the front end of the machine by the retraction of the feed bars 49 in the reciprocating movements of these feed bars. At this stage it will be noted that a cup body tube having overlapped edges has been formed around the horn 51, the overlapped edge portions being smoothly in contact. The overlapping relation of the edges of the tube is obtained by having one of the gripping jaws 53 act slightly in advance of the other in the initial part of its gripping movement.

The body tubes 62 are intermittently fed along the combined supporting and guiding horn 51 by means of pairs of pivoted spring-pressed pawls 63 at the sides of the horn and engaging in grooves therein as clearly appears in the drawings. The pawls of the first pair of these pawls 63 are mounted on the rear ends of the feed bar sections 49 and the rest of these pairs of feed pawls 63 are mounted on rear extensions 64 of the feed bar sections 49 shown as secured thereto by means of screws, see Fig. 20. At their forward ends the feed bar extensions 64 are cut away adjacent to the horn 51 as appears in the drawings, particularly in Figs. 9 and 20, to provide a free space for the downward forming movement of the second pair of formers 46 and for the bending of the blank by these formers 46 around the horn 51, upon the retraction of the feed bar sections 49 and 64. For preventing retrograde movement of the body tubes 62 on the horn 51, a stationary lock rail 65 is mounted lengthwise over the horn 51 and is equipped with spring-pressed pressure-applying plates 66 and also with gravity pawls 67, 68, 69, 70 and 71, the pawls 67, 69 and 70 being also spring-pressed to the engaging position. The first two pawls 67 and 68 are mounted on the side of the forward end of the lock bar 65 alongside of one of the pressure applying plates 66, and the pressure applying plates 66 and the remaining pawls, namely 69, 70 and 71, are mounted in a longitudinal groove in the lower side of the lock rail 65, as shown in the drawings, particularly in Figs. 29 and 30.

At each reciprocation of the feed bars, made up of the forward sections 49 and the rearward sections 64, the sheared off blanks on the bed plate 5 and the tubes on the horn 51 are all fed toward the rear end of the machine, the feed pawls 48 and 63 being properly spaced so that at each complete reciprocation the pairs of these pawls will engage at the rear of the blanks and tubes and push them forward one step to a position in which they will be engaged by the next succeeding pair of pawls at the next reciprocation of the feed bars. The pair of feed bars, having forward sections 49 and rearward sections 64, are reciprocated once for each complete revolution of the main shaft 26 by means of a cam 72 fixed on the main shaft 26 and operating a bent lever 73 which is forked or bifurcated at its upper end and engages a split guiding block 74 which is pivoted on a connector 75 which joins the projecting ends of the forward feed bar sections 49, as appears in Figs. 1, 2, 5 and 20. The feed lever 73 is operated in the working or feeding direction by the cam 72 and is retracted by a strong coiled extension spring 76 extending along the base of the machine frame to which it is anchored, as is shown in Fig. 1 of the drawings.

The required strength of this spring 76 is so great and the necessary shape of the feed cam 72 is such that when the anti-friction roller shown on the feed lever 73 passes over the rise of the cam 72, then this strong spring 76 has a tendency to accelerate the machine momentarily in an objectionable manner which would interfere with its operation and which would be likely to cause choking and damage of the machine were not some provision made to counteract this tendency. For this purpose, that is to secure steadiness of running of the machine, a brake is shown as provided on the main shaft 26. This retarding brake comprises a brake drum 77 fixed on the main shaft 26 between the feed cam 72 and the spur gear 27 on the end of the shaft 26, the brake drum 77 being surrounded and gripped by a split clamp band 78 which is anchored against rotation, as clearly appears in the drawings, particularly in Figs. 3 and 4 thereof.

Another feature to be noted in this connection and which is in the nature of a safety device is for preventing the descent of the powerful reciprocating head 41 unless the feed bars 49 and 64 are fully retracted by the spring 76. Although the spring 76 is strong yet occasionally the feed bars might stick or move sluggishly and in such a case they would be struck by the second pair of formers 46 and either they or the formers would be bent or broken. To prevent accidents of this kind a stop plate 79 is strongly secured to the front end of the head 41 and coöperates with a sliding abutment 80 shown as mounted on the upper surface of the forward end of the frame of the machine by means of a tap bolt which passes through a slotted hole in the abutment 80. A rod 81 extends outward from the abutment member 80 and is provided with a side extension 82 to which is attached a retractile spring 83, the other end of which is anchored to the frame of the machine, this spring 83 tending to hold the inner end of the sliding abutment 80 in the path of the descending stop plate 79 on the head 41. A lateral arm 84 projecting out from the connector 75 of the feed bars 49 surrounds the rod 81 and slides thereon with considerable lost motion. This lost motion is such that the sliding abutment 80 is only retracted out of the path of the descending stop plate 79 during the very last portion of the return movement of the feed bars 49 and 64. If at any time the feed bars should not be completely retracted then the movable abutment 80 will remain in the path of the descending stop plate 79 carried by the head 41 and will prevent the head 41 and the parts carried thereby from descending, and as the head 41 and its connections are strong enough to prevent breaking, the only result will be the slipping of the drive belt on the main pulley 36.

The means for sealing or hermetically closing the overlapped side seam in the cup body will now be described. The surfaces of these body tubes 62 at the overlapped side seams are first cleansed and then soldered together. The cleansing operation is performed by an acid-applying wheel 85 the upper circumferential edge of which lies in the path of the seams or overlapped edges of the tubes 62 at the lower side of the horn 51. The acid is applied as the tube 62 is moved forward by the first pair of side pawls 63 after the last formed operation performed by the gripping jaws 53. The axis of the acid wheel 85 is transverse to that of the horn 51 and the acid wheel is rotated in a direction so that its upper edge travels oppositely to the direction of movement of the advancing tube 62, as is clearly indicated in Fig. 5. The lower portion of the acid wheel 85 dips into an acid bath contained in a well 86 and the acid wheel 85 is composed of suitable pliable and acid resisting material, for example, soft rubber. The acid wheel 85 is fixed on a small transverse shaft 87 which is driven directly from the hub of the main drive wheel 36 by means of a small round belt 88 and pulley wheel 89 on the shaft 87. After the surfaces at the seam of the tube 62 have been thus cleansed, the tube is pushed forward on the horn 51 by the feed pawls 63 into position for the seam to be soldered by the soldering device which will next be described.

The soldering device includes a solder-applying roll 90 fixed on a shaft 91 below the horn 51 and parallel therewith. The soldering roll 90 dips into melted solder in a solder-containing tank 92 shown as provided with a heater 93. The solder-applying roll 90 is located opposite one of the positions of rest of a body tube 62 on the horn 51, as is shown in the drawings, for example in Figs. 5 and 9. The solder roll shaft 91 is carried by an arm 94 pivoted at the back of the machine and projecting to the front thereof so that the soldering roll 90 may be raised to the soldering position and lowered away therefrom as required. A retractile spring 95 attached to the arm 94 and to the frame of the machine tends constantly to raise the solder-applying roll 90 to the operative position, and the arm 94 is periodically depressed to remove the soldering roll 90 from the soldering position by means of a cam 95$^a$ carried by the side shaft 17 of the machine, as probably most clearly appears in Fig. 14. The timing of this cam 95$^a$ of course is such that the solder is applied by the roll 90 during the period of rest of a body tube 62 and that the soldering roll 90 is then depressed out of contact with the soldered tube, while this tube is moved forward and another one takes its place by reason of a reciprocation of the feed bars and the fed pawls 63 carried thereby, as hereinbefore explained. The soldering roll 90 is rotated by means of three spur gears 96, 97 and 98, the first, 96, of which is fixed on the solder roll shaft 91, the second, 97, of which is an idler gear mounted on the arm 94, and the third, 98, of which is fixed on an actuating shaft 99 concentric with the pivot of the arm 94. The short shaft 99 for driving the soldering roll 90 is driven from the acid wheel shaft 87 by means of intermediate bevel gears 100.

During the soldering operation and after the solder has been applied it is necessary to hold together the overlapped soldered edges of the tube 62 until sufficient cooling has taken place so that the solder will firmly hold. This is accomplished partly by stationary side guides 101 below the feed bars 64 at each side of the horn 51 below the center thereof and is further accomplished by means of spring-pressed holding plates 102, see Fig. 15 particularly, one such holding plate being located above the center and at each side of the horn 51 and at opposite sides of the pressure-applying plates 66 above the horn at the middle thereof. These pressure plates 66 also afford assistance in holding the tube 62 in shape during its cooling. While the soldered tubes 62 are cooling they are fed idly along the horn 51 during which time their heat is largely lost, being for the most part conveyed away by the horn 51 and other parts of the machine. However, special cooling means may be provided should it in any case become necessary, but in the particular machine now being described it has been found to be unnecessary to provide any such special cooling means for the tubes 62. Also in this particular machine by reason of the length of the solder roll shaft 91 beyond its bearing in the arm 94 a yieldable bearing member 103, held up by a thrust spring 104, is provided for the outer free end of this shaft 91, as appears in Fig. 5.

It should be noted that the tube-guiding horn 51 is provided with a rather broad groove along its lower side opposite the seam or joint of the tube 62, this broad lower groove being sub-divided for a portion of its length beginning at the soldering point, by a central ridge, as appears in Figs. 14, 15 and 24. This groove aids in obtaining the proper overlapping relation of the tube edges while preserving their true cylindrical form and the central sub-dividing ridge provides a backing for the soldering wheel 90.

At the free end of the horn at the rear end of the machine a bent leaf spring 103ª has one of its ends secured to the horn within the lower groove just mentioned and projects downward below the cylindrical surface of the horn 51 adjacent to the end thereof, the purpose of this spring 103ª being to assist in preventing a tube 62 when it has reached the end of the horn 51 from accidentally continuing its movement by reason of its momentum of travel and thus escaping from the end of the horn.

Bottoming devices for inserting and positioning cylindrical bottom-forming disks within one end of each of the body tubes 62 will next be described. As a cooled and soldered body tube 62 approaches the free end of the horn 51, the last pair of feed pawls 63 will push the tube slightly off the end of the horn 51 so that it will project therefrom for about one-third of its total length, as is shown in Figs. 1, 2, 7, 31 and 37 of the drawings. This will bring the tube 62 with its rear or following end just at the front of the last check pawl or back stop pawl 71. The check pawl 71 is spring-mounted so that it yieldingly holds the tube 62 in its projecting position but will permit this tube to yield backwardly over the horn toward the front end of the machine. This yielding movement of the pawl 71 is provided for by means of a slot in the pivoted end of the pawl through which its pivot pin 104 in the lock rail 65 passes and the pawl 71 is yieldingly pressed toward the end of the horn 51 by a leaf spring 105 which extends upward through an opening in the lock rail 65 and is secured to a part of the frame of the machine as appears in Fig. 7.

The circular bottom blanks 106, which have been previously punched out from sheet zinc, are contained in an upstanding but inclined magazine 107 which leans at its upper end toward the front end of the machine, this magazine 107 being tubular in its lowermost portion for better guiding purposes but for most of its length and in its upper portion being open and of semi-cylindrical cross-section as clearly appears in the drawings. An inclined feed blade 108 is arranged at right angles to the magazine 107 and at its lower end forms a closure for the tubular lower end of the magazine 107, as perhaps most clearly appears in Fig. 31, the stack of bottom blanks 106 resting upon the lower end of the feed blade 108. The lower end of the feed blade 108 is slightly tapered and is provided on its upper side with a face plate as shown, this face plate being notched to form a shoulder concentric with a bottom blank 106, as indicated in Fig. 35, this shoulder being of a height equal to the thickness of one of the bottom blanks 106. The face plate on the feed blade 108 adjacent to its shoulder just mentioned is provided with short feed studs 109 which project level with the top of the shoulder and are for engaging the edge of a bottom blank 106 at opposite sides of its center so as to properly center it, as is indicated by the broken line circle in Fig. 35. The feed blade 108 is mounted in guideways in the frame of the machine so that it can move diagonally downward in the direction of its length so that its lower end will enter the projecting end of the tube 62 at the end of the horn 51, this position of the feed blade 108 being indicated in broken lines in Fig. 31.

At each downward or feed movement of the feed blade 108 a bottom blank 106 will be pushed edgewise at an inclined or oblique angle into the projecting end of the tube 62 which is then projecting from the end of the horn 51 after which the feed blade 108 is returned to its upper position, appearing in full lines in Fig. 31, and the bottom blank 106 remains in the end of the tube 62 where it has been inserted, by reason of friction. The downward feed movement of the feed blade 108 is imparted quickly and the means for doing this is a coiled retractile spring 110 anchored at its lower end to a part of the frame of the machine and at its upper end attached to an extension of the feed blade 108, as clearly appears in the drawings. After having performed its feeding operation the feed blade 108 is retracted to its upper bottom-forming and bottom blank engaging waiting position by means of a cam 111 acting upon a bell-crank lever 112 which is pivoted on the frame of the machine and the upper arm of which is connected by a link 113 to the upper end of the feed blade 108. The feed blade operating cam 111 is mounted upon and driven by a short cross shaft 114 having bearings in the frame of the machine at the rear end thereof and connected to the longitudinal side shaft 17 to be driven thereby by means of a pair of bevel gears 115.

A bottom-positioning plunger 116 is mounted in alinement with the horn 51 and the projecting cup body 62 thereon and is carried by a slide 117 which is guided in longitudinal guideways formed in the frame of the machine at the front side and rear end thereof, as appears in the drawings, more particularly in Figs. 7 and 38. The bottom-positioning plunger 116 is positively moved forward toward the end of the horn 51 and into close proximity thereto by means of a plunger-operating cam 118 fixed upon the cross shaft 114 alongside of the feed blade cam 111, this plunger-operating cam 118 directly engaging with an anti-friction roller carried by the slide 117 as clearly appears in the drawings. The bottom-positioning plunger 116 is moved to its retracted position appearing in the drawings, by means of a retractile spring 119 which is attached at its forward end to a stud 120 projecting from the side of the bottom-positioning plunger 116 and at its other or rear end is anchored to the frame of the machine, as perhaps most clearly appears in Figs. 31 and 34 of the drawings. Near its forward bottom-engaging end the bottom-positioning plunger 116 is provided with an annular flange as shown, which engages the projecting end of the tube 62 on the end of the horn 51.

When the plunger 116 is moved positively forward toward the horn 51 by its actuating cam 118, it approaches toward the horn until there is only space left between the end of the plunger and the end of the horn to accommodate one of the bottom-forming blanks 106. At the same time the annular flange on the plunger 116 engages the end of the projecting tube 62 on the horn and pushes this tube back upon the horn, at the same time pushing the pawl 71 backward against the tension of its restraining spring 105. It will now be clear that the bottom-positioning plunger 116 straightens the bottom blank in the end of the body tube and positions it transversely thereof within such tube near but slightly spaced from the projecting end thereof, the bottom blank being spaced inward or upward from the end of the tube to the extent that the bottom-positioning end of the plunger 116 projects beyond its annular tube-engaging flange. When a bottom blank 106 is thus positioned transversely of the end of a body tube 62, it will be quite firmly held therein by frictional engagement.

Movable guiding means are provided for preventing accidental displacement of a bottom blank 106 from the end of the feed blade 108 during the time that this bottom blank is being carried from beneath the stack of such blanks at the lower end of the magazine 107 to its position within the projecting end of the body tube 62 on the horn 51. For this purpose a guide head 121 in its lower or guiding position forms a guide for the upper surface of the bottom blank 106 as it is carried along by the feed blade 108. The guide head 121 has a stem 122 which is slidable in a stationary guide 123 which latter extends parallel with the inclined magazine 107 on the side thereof adjacent to the free end of the horn 51. The stem 122 is tubular in its upper portion and it contains a thrust spring 124 which has a bearing at its upper end against an abutment plug 125 contained in the upper tubular portion of the stem 122, this abutment plug 125 being held in place by a screw pin 126 which is screwed into the tubular guide 123 and passes inwardly through a slot in the side of the stem 122 and enters the abutment plug 125, as is clearly shown in Fig. 31 of the drawings. The thrust spring 124 tends constantly to hold the guide head 121 down in its guiding position. However, in its lower or guiding position the guide head 121 is in the path of the bottom-positioning plunger 116 and accordingly means are provided for retracting the guide head 121 out of the path of the bottom-positioning plunger 116. For this purpose a cam wedge 127 is secured to the forward end of the plunger-actuating slide 117 at the front side of the machine in position to engage a roller mounted upon the same side of the guide head 121, as appears most clearly in Fig. 7. The wedge 127 projects in advance of the bottom-positioning plunger 116 and raises the guide head 121 out of the way of the plunger 116 as the latter moves forward to position a bottom blank 106 in the end of a body tube 62 projecting from the end of the horn 51. When the bottom-positioning plunger 116 is withdrawn by its spring 119 the guide head operating wedge 127 is also drawn back after the plunger 116 has passed backward out of the way and the thrust spring 124 is then left free to return the guide head 121 to its guiding position for coöperation with the feed blade 108 at its next operation of inserting a bottom blank 106 within the projecting end of the next body tube 62.

A safety device is provided in control of the operation of the feed blade 108 to prevent the feeding of a bottom blank 106 in case for any reason there should not be a body tube 62 projecting from the end of the horn 51 in position to receive such bottom blank, thereby not only saving the bottom blank which would be thus uselessly fed but also obviating the possibility of these blanks falling down and interfering with the operation of other parts of the machine. It has been hereinbefore noted that the feed blade 108 is retracted or drawn back by the cam 111 and that it is moved in its feeding operation by the spring 110. A combined feeler and trigger bar 128 of somewhat irregular bent shape is pivoted near its middle to the frame of the machine and has a feeler portion extending forward toward the horn 51 and has a trigger portion extending backward and upward substantially parallel with the length of the feed blade 108, as clearly appears in Figs. 2 and 31 of the drawings. The feeler or finger end of this bar 128 is bent in inverted U-shape over and downward below the rear end of the lock rail 65 in position to rest at its end upon a cup body 62 when such cup body is in the bottoming position on the end of the horn 51, see Fig. 33 particularly. At this point, that is to say, at a point below or opposite the lower end of the finger end of the bar 128, the horn 51, is provided with a notch, as clearly shown in the drawings, particularly in Fig. 33, into which notch the free end of the finger will drop in case there should be no body tube 62 on the horn in this position. However, if a body tube 62 is present such body tube will hold up this end of the bar 128, as is shown in the drawings, particularly in Fig. 33. The rear or trigger end of the combined trigger and feeler bar 128 is bent inward beneath the feed blade 108 and is there turned upward terminating in a pin or stud which at its end is in close proximity to the lower surface of the feed blade 108, as appears in the drawings, particularly in Fig. 31. The feed blade 108 is provided with a hole or socket for receiving this projecting end of the trigger, this hole in the feed blade 108 being so placed as to be in position to register with the trigger end of the bar 128 when the feed blade 108 is at its rear and upward or retracted position where it has been drawn by the feed blade operating cam 111. The forwardly extending or feeler end of the bar 128 is heavier than the rear and upwardly inclined trigger end thereof so that this bar 128 has a normal tendency or bias to rock upon its pivot in a counter-clockwise direction as viewed in Fig. 31, the feeler or finger end thereof descending and the trigger end thereof being raised. In case no body tube 62 comes forward to its place on the end of the horn 51 then the downwardly extending feeler finger in which the forward end of the bar 128 terminates will drop into the notch provided therefor in the horn 51 where it will remain and the trigger stud at the other or rear end of the bar 128 will be raised and retained in the recess in the lower side of the feed blade 108 and will prevent the forward or feeding movement of the feed blade 108 under the impulse of the feed blade actuating spring 110 and the feed blade 108 will thus be locked in its upper or retracted position and its operating cam 111 will rotate idly. It will now be seen that the controlling device just described is in control of the bottom-inserting device and is controlled by the tube on the horn so that the bottom-inserting device is rendered non-operative should there be no tube on the horn.

At this point it is well to note that all parts of the bottoming devices just described, including the feed blade 108 and its operating means and appurtenances and adjuncts and including also the bottom-positioning plunger 116 and its operating means and adjuncts, are all mounted upon a removable carrier block or frame piece 129 which is secured to the main frame of the machine by means of a sliding interlocked joint and held in place thereon by means of a clamp screw 130, as appears in the drawings, more particularly in Figs. 2, 31 and 38. By slightly loosening the clamp screw 130 the carrier block 129 together with all of the parts mounted thereon may be slipped backward and removed or completely detached from the rest of the machine. The purpose of this feature of construction is to permit ready access to the parts of the machine adjacent to the rear end of the horn 51.

After a bottom blank 106 has been inserted and positioned in the projecting end of one of the body tubes 62 this bottom-containing tube will be pushed from the end of the horn 51 at the next operation of the machine by the advancing of the next adjacent body tube 62, this feeding forward of the tube 62 of course taking place during the period of retraction of the feed blade 108 and of the bottom-positioning plunger 116 so that there is free space for the last tube 62 containing the bottom as described to be pushed from the end of the horn 51. When a bottom-containing tube 62 is thus pushed from the end of the horn 51 it will drop straight down into the open slightly flaring upper end of a somewhat irregularly shaped but on the whole downwardly inclined chute 131, the upper end of this chute 131 being vertical and the lower or discharge end thereof being substantially horizontal at its mouth, as is shown in the drawings, more particularly in Fig. 36. The chute 131 at the front thereof is provided with side guide strips 132 which engage the ends of the descending bottom-containing tubes, an open space or slot being left between the side strips 132. From the lower substantially horizontal end of the chute 131 the bottom-containing tubes 62 are supplied to devices for having their bottom seams soldered, as will presently be described. These devices take or remove the last or lowermost bottom-containing tube 62 from the lower end of the chute 131, the chute at this point consisting only of a horizontal bottom plate, the sides of the chute 131 and the ends of the front plates 132 being omitted at this point. The tubes as they descend are prevented from escaping from the end of the chute 131 by an end closure or gate 133 which has rearwardly extending arms pivoted to the frame of the machine and is held in position by an inclined brace 134 which at its upper end is disconnectible for raising the gate 133 out of the way when this is desired for any reason, but at all times during the operation of the machine the gate 133 is in the closed position so that the lowermost bottom-containing tube 62 may rest against this gate 133.

In view of the fact that the bottom-containing tubes 62 descend by gravity through the inclined chute 131, it is of practical importance in the operation of the machine that this chute should at all times be filled or nearly so with the bottom-containing tubes 62 so that the weight of those above will push the lowermost one to its position at the lower end of the chute against the gate 133. To assure this condition a guard device is provided which prevents the movement of the lowermost bottom containing tube 62 to the terminal position against the gate 133 unless a fresh bottom-containing tube is first pushed free from the end of the horn 51 so as to drop into the upper end of the chute 131 for replenishing the supply of bottom-containing tubes therein, and this guard device will now be described.

Although the terminal back stop pawl 71 for the body tube 62 on the horn 51 has a yielding slotted connection with its pivot pin 104 as and for the purpose hereinbefore described, this pawl 71 is rotatively fixed upon its pivot pin or shaft 104, this being accomplished by reason of the flattening of the pivot pin 104 where it passes through the slot of the pawl 71, as appears in Figs. 29 and 37. The rotative pivot pin 104 for the pawl 71 extends outwardly some distance to the front side of the machine and is supported in a bearing 135. The outer projecting end of the pivot pin 104 has a rearwardly projecting rock arm 136 fixed thereon, this arm being shown as of somewhat greater length than the pawl 71 and as projecting substantially parallel thereto. A long link bar 137 pivotally connects the free end of the rock arm 136 with a second gate 138 for the chute 137, the gate 138 having rearwardly extending supporting arms pivoted at opposite sides of the rear of the chute 131 in similar manner to those of the first described gate 133, as is shown in the drawings quite clearly. The chute gate 138 in its closed position, as shown in the drawings, only obstructs the upper part of the lower end of the chute 131 to a sufficient extent to prevent the outward passage of a bottom-containing tube 62 and is spaced backwardly or inwardly from the first gate 133 somewhat more than the diameter of a tube 62 so that when the gate 138 is closed it will support the weight of and restrain the movement of all of the body tubes above it and will keep the last one of the tubes above it spaced away from and out of contact with the very last or terminal tube which lies against the first or outer gate 133 and is thus left free to be easily moved away by the devices hereinbefore mentioned and soon to be described, for the sealing of the bottom seam. This holding back of the lower of the tubes in the chute 131 above the second gate 138 so as not to obstruct the removal of the last tube from its position between the gates 133 and 138 and also at the same time preventing the descent of another bottom-containing tube 62 to the last or delivery position between the gates prematurely or until such time as it is needed there to replace the preceding tube which has been removed from between the gates for sealing, is really the primary function of this gate and its hereinbefore mentioned guarding function, now to be more particularly noted, is a secondary although important function of the gate 138. In order to accomplish surely its tube-restraining and tube-supplying function the second gate 138 could be operated in timed relation, from any convenient moving part of the machine, but in order to assure its safety or guarding function this gate is operated from the pawl 71 through the intermediate link 137.

The pawl 71 in its lower position enters a groove in the upper side of the horn 51, this groove most clearly appearing perhaps in Fig. 22 of the drawings. The weight of the pawl 71, its rock arm 136, the connecting link 137 and the gate 138 all tend to maintain the pawls 71 and the gate 138 in their lowermost position in which the gate 138 is closed but this position of these parts is strongly assisted by means of a coiled retractile spring 139 shown as connected to one of the supporting arms of the gate 138 and as anchored to the chute 131 at the side thereof, as shown more particularly in Fig. 36. The pawl 71 is raised by each body tube 62 as it moves from next to the last to the last or bottoming position at the end of the horn 51, and the raising of the pawl 71 raises the gate 138 and permits a bottom-containing body tube 62 to escape and move outward to the last position in contact with the outer or first gate 133 as shown. As a moving body tube 62 on the horn 51 passes the end of the pawl 71, the weight of the several parts together with the gate spring 139 will quickly close the second gate 138. The quick closing movement of the second gate 138 will catch the next advancing bottom-containing body tube 62 in time to hold it back out of contact with the tube which has just escaped to the space between the gates 133 and 138, as is clearly shown in Fig. 36 of the drawings. Therefore it is seen that this second gate 138 controls the delivery of the tubes 62 from the chute 131 and is directly operated by the pawl 71 which in turn is operated directly by the moving body tubes 62 on the horn 51. Should there be no tube on the horn 51, then none will be delivered from the lower end of the chute 131 and the supply therein will be maintained for assuring proper operation.

The devices hereinbefore referred to for taking away the bottom-containing tubes 62 and sealing the bottom seam thereof will now be described. A horizontally arranged turret-loading plunger 140 is longitudinally movable in a guideway 141 at the rear end of the machine on the front side thereof. The turret-loading plunger 140 successively pushes the last of the bottom-containing body tubes 62 from its position of rest upon the horizontal lower end portion of the chute 131 forward toward the front end of the machine and over one of the rotating spindles 142 of an intermittently rotated turret 143, during the successive periods of rest in the intermittent rotation of the turret 143, the turret-loading plunger 140 and the turret spindle 142 which is to be loaded being in alinement at this time. The pushing or spindle-loading end of the turret-loading plunger 140 is shown as of flat shape and, in view of the fact that it engages the end of a tube 62 which contains a bottom blank 106 which at this time is only held therein by friction, the end of the turret-loading plunger 140 is made of a greater width than the diameter of the body tube 62 so that it will engage with the end of such body tube and thereby not displace the bottom blank 106 from its proper transverse position in the same end of the body tube. A transverse groove is shown as formed in the projecting lower bottom portion of the chute 131 which groove provides space for the wide end of the turret-loading plunger 140 and also assists in holding the body 62 of the incompleted cup in proper place in alinement with the turret-spindle 142 upon which it is to be pushed by the turret-loading plunger 140. The turret-loading plunger 140 is actuated in its turret-loading movement by a retractile spring 144 shown as anchored to the guide bearing 141 and as attached at its other end to an outwardly projecting extension from the rear end of the turret-loading plunger 140. The turret-loading plunger 140 is retracted or withdrawn by a plunger-operating cam 145 fixed on the forward end of a transverse shaft 146 having bearings in or being journaled in and extending through the main machine frame from one side of the machine to the other thereof. This cam shaft 146 is concentric with and passes through the turret 143 but rotates independently of the turret, which latter is mounted on a bearing sleeve as shown in Fig. 41, the plunger-operating cam shaft 146 rotating continuously in the operation of the machine while the rotation of the turret 143 is intermittent, as hereinbefore noted. The turret-loading plunger 140 is provided with an offset forwardly extending combined operating bar and guide bar 147 which at its forward end adjacent to the plunger-operating cam 145 is provided with a cam roller as shown and is bifurcated and engages at opposite sides of the transverse shaft 146. The operating cam 145 for the turret-loading plunger 140 is formed with an abrupt shoulder, as clearly appears in the drawings, so that as it rotates in a counter-clockwise direction, as viewed from the front side of the machine and as indicated by the arrow on the end of the shaft 146, Fig. 7, the plunger 140 after having been gradually retracted by the gradual rise of the cam 145 will be suddenly released and quickly actuated by its spring 144.

The turret spindles 142, shown as eight in number, project radially beyond the periphery of the turret 143. The turret spindles 142 are of split spring construction, as appears in the drawings, see Figs. 39 and 40, so as to resiliently frictionally hold the battery cups with sufficient firmness and security so they will not drop from the spindles during the intermittent rotation of the turret which is in a counter-clockwise direction as viewed from the front side of the machine, so that the incomplete cups successively loaded on the spindles 142 by the turret-loading plunger 140 during the periods of rest of the turret 143 are carried downward from the plunger 140 by the intermittent rotation of the turret 143. The cup-receiving turret spindles 142 are fixed upon radial spindle-rotating shafts 148 journaled in the turret 143 and these radial shafts 148 are provided at their inner ends with bevel pinions 149, all of which are engaged by a bevel gear 150 fixed upon the cam shaft 146. This spindle-rotating bevel gear 150 on the cam shaft 146 is shown as located at the front of the turret 143 adjacent to the plunger-actuating cam 145 so that in the counter-clockwise rotation of the cam shaft 146, the cup-holding turret spindles 142 will be rotated in a clockwise direction as viewed from the outer ends of these spindles, and as indicated by the arrows in the drawings. It will be noted that the hub of the bevel gear 150 guides the forked end of the plunger-operating bar 147.

The driving means employed for imparting the intermittent step by step rotation to the spindle-carrying turret 143 will now be described. The turret 143, see particularly Figs. 40 and 41, is provided at the back with a circumferential series of equidistantly spaced lugs forming teeth, these lugs being eight in number, corresponding to the spindles 142. The turret 143 is also peripherally notched at points opposite the side lugs just mentioned and as appears in the drawings, particularly Fig. 40, these peripheral notches being for the reception of a turret-holding latch 151 which is carried by a pivoted latch lever 152 shown as provided at its free end with an anti-friction roller. The latch 151 is pressed toward its engaging position by a coiled thrust spring 153 interposed between the back of the latch lever 152 and an abutment bracket 154 on the frame of the machine. The latch 151 holds the turret 143 stationary during intervals of time between its intermittent rotation. A turret-operating shaft 155 is journaled in the frame of the machine and extends transversely through from the front side thereof to the back, this shaft 155 being shown as forward from and below the cam shaft 146. A turret-actuating member 156 is fixed upon the projecting forward end of the turret-operating shaft 155 to rotate in a clockwise direction as seen from the front side of the machine. The turret-actuating member 156 is provided, as shown, with a cam projection having an outer or peripheral surface which is shown as concentric with the shaft 155. As the operating shaft 155 rotates this cam projection will engage the cam roller on the free end of the latch lever 152 and will disengage the latch 151 from the turret 143 and will hold the latch thus disengaged during the passage of the concentric portion of the cam projection on the turret-actuating member 156. The turret-actuating member 156 is also provided with a projecting stud 157 shown as having thereon an anti-friction roller which enters the spaces between the above mentioned lugs or teeth on the side of the turret 143 for imparting a partial rotation to the turret 143 once during a part of each complete rotation of the turret-operating shaft 155, the relation of the parts being such that this partial rotation of the turret 143 takes place during the time that the latch 151 is disengaged. The arrangement of the parts is also such that the latch 151 is not disengaged by the cam projection on the actuating member 156 until after the roller carried by the stud 157 has begun its entrance into one of the radial notches or spaces between the side lugs of the turret 143; and the latch 151 is permitted to be returned by its spring 153 to locking position with the turret 143, a notch of which has been brought into register with the latch, while the roller on the stud 157 of the actuating member 156 is still engaged between the side lugs or teeth of the turret 143, this latter being the position of the parts shown in the drawings, excepting in Fig. 39, see particularly Figs. 7 and 40. Because of this interlocking arrangement of the parts, the spindle-carrying turret 143 is never left free at any time for accidental displacement. At the back of the machine the cam shaft 146 and the turret-operating shaft 155 are geared together for unitary rotation in opposite directions by means of similar spur gears 158, and the turret-operating shaft 155 is geared to the main shaft 26 to rotate therewith in the same direction and at the same speed by means of a sprocket chain 159 and a pair of similar sprocket wheels 160.

Now that the construction of the spindle-carrying turret 143 and its operating means have been described the devices for sealing the bottom joint or bottom seam of the incomplete cups which are pushed over the rotating turret spindles 142 by the turret-loading plunger 140, will next be described. First the surfaces at the bottom seam are cleansed preparatory to soldering and this cleansing is accomplished by means of an acid-applying device including an acid container or bottle 161 which is closed at its mouth by a plug or stopper 162 of suitable absorbent material, such for example, as felt. The acid-containing bottle 161 is inclined downward in its body portion but at its mouth is inclined slightly upward and is positioned so that the acid-applying absorbent stopper 162 is in proximity to and in alinement with one of the turret spindles 142 which corresponds to the first position of rest of this spindle after it has left the loading position in alinement with the turret-loading plunger 140. The acid bottle 161 is movably supported by a rocking member 163 pivoted on a stud 164 which rigidly projects from the frame of the machine, this rocking member 163 including a sleeve on the supporting stud 164 and two arms forming a bell-crank lever, these two bell-crank arms extending diagonally downward in opposite directions. The rearmost of these arms is provided with a terminal split socket which surrounds and removably holds the acid bottle 161. At intervals and at the proper time the bottle-carrying rocking member 163 is rocked in a counter-clockwise direction to bring the acid-applying absorbent stopper 162 into contact with the lower end of a rotating bottom-containing tube 62 on the cup-carrying spindle 142 which has stopped at that position at a period of rest of the intermittently rotated turret 143 and such contact is preserved for a sufficient length of time to effect the desired cleansing result of the surfaces at the bottom seam.

The soldering device includes a solder container or tank 165 and a heater 166 therefor, for maintaining the solder in a melted condition. A slightly cup-shaped solder-applier 167 is positioned beneath and in alinement with the spindle 142 which stops at the lowermost position in the intermittent rotation of the spindle-carrying turret 143. The solder-applier 167 is carried by a sleeved rocking member 168 which is pivoted to rock upon a stud 169 projecting from the frame of the machine. The rocking member 168 is shown as counter-weighted at the opposite side of its pivot stud 169 from the solder-applier 167 and is also shown as provided at the outside of the solder-containing tank 165 with an actuating arm which projects substantially in the same direction as the actuating arm of the rocking member 163 which supports the acid-applier, as is clearly shown in the drawings, for example in Figs. 1 and 7. The rocking support 168 is rocked in a counter-clockwise direction at the proper intervals of time and held in this position for a sufficient length of time for the proper application of solder by the solder-applier 167 to the cleansed surfaces at the bottom seam of the bottom-containing cup body held on the rotating spindle above the solder-applier 167 in position to be engaged thereby.

The solder-applying device and the acid-applying device are both operated from the cam shaft 146 by means of a second cam 170 fixed thereon. In the particular machine illustrated in the drawings this cam 170 for operating the bottom-cleansing and bottom-soldering devices is shown as formed integral or in one piece with the cam 145 hereinbefore described, the two cams being shown in the drawings as spaced apart and united together by means of an intermediate connecting sleeve surrounding the common cam shaft 146, as most clearly appears in Fig. 41. The operating cam 170 is so shaped as to give the necessary periods of rest to the acid-applying stopper 162 and to the solder-applying member 167, both at their upper or active position and at their lower or inactive position. A soldering device actuating rod 171 is pivoted to the actuating arm of the rocking member 168 and has portions extending at opposite sides of and guided by a guide block 172 mounted on the outer end of the cam shaft 146. The guide block 172 is shown as having a stem extending upwardly and guided in the upper end of the connecting rod 171 and a coiled thrust spring 173 surrounds this stem of the guide block 172 and acts between the guide block 172 and the connecting rod 171 with a constant tendency to raise the latter and thereby to elevate the solder-applying member 167 to the solder-applying position. The solder-applying member 167 is depressed to its non-operative position by the cam 170 which engages with a cam roller carried by the connecting rod 171 at the side thereof in position to be in the path of the cam 170, whereby the connecting rod 171 is depressed against the tension of the spring 173.

The sleeved rocking member 163 of the acid-applying device is connected to and operated from the connecting rod 171 of the soldering device by means of a connecting rod 174 which connects the actuating arm of the sleeved rocking member 163 of the acid-applying device with an operating stud 175 which projects forward from the upper portion of the solder device connecting rod 171 at a point near the cam shaft 146 and operating cam 170, as clearly appears in the drawings, for example in Figs. 1 and 7 thereof. The upper end of the connecting rod 174 is slotted for sliding upon and being guided by a bearing block 176 which is engaged at one side by the actuating stud 175. The bearing block 176 is provided as shown with a projecting stem which is guided in the upper end of the connecting rod 174, and a coiled thrust spring 177 surrounds this stem of the bearing block 176 and acts between such bearing block and the connecting rod 174 to permit a yielding of the bearing block 176 when the acid applier 162 is raised and pressed against the bottom of a cup by the connecting rod 174 as it is raised by the stud 175, this spring 177 being of somewhat less strength than the spring 173 so that the latter as it raises the connecting rod 171 of the solder-applying device will also yieldingly operate the connecting rod 174 of the acid-applying device. It will be noted that the acid-applying device and the solder-applying device are both operated at the same time to act upon different cups during the same period of rest of the turret 143 and also that at this same period of rest an incomplete bottom-containing cup is pushed over another turret spindle 142 by the turret-loading plunger 140, that is to say, one of the incomplete cups is loaded on a turret spindle 142 at one position, another of these cups has a bottom seam cleansed at the same time on another of the turret spindles at another and next adjacent position of the turret 143 and a third of these cups has its bottom soldered in place on another of the turret spindles 142 which has reached the next succeeding position, all at one period of rest of the turret 143.

After the completion of the bottom soldering operation as above described, the battery cup is in a complete condition on the turret spindle 142 which it occupies but is in a heated condition from the bottom soldering operation and therefore could not be immediately or quickly discharged or ejected from the machine without liability of dislodging the freshly soldered bottom. For this reason, the completed cup is left to remain upon the turret spindle and is carried around thereby to the four next positions of rest and through a half rotation of the intermittently rotated turret 143 and is subjected to a cooling operation before being removed from the turret spindle and ejected from the machine. In the particular machine illustrated in the drawings the bottom of the hot freshly soldered cup is subjected at three of these positions next following the soldering position to a cooling draft or current of air by means of nozzles 178 supplied with cooling air from an air supply pipe 179 which may be connected to any suitable source of compressed air. It has been found, however, that this bottom cooling means may ordinarily be omitted and the present machine has been successfully operated without its use. It is to be noted that other air supply nozzles similar to those 178 may likewise be provided for effecting or assisting in the cooling of the cup body tubes 62 on the horn 51 after the soldering of the side seam thereof as hereinbefore described.

The ejecting device for removing the completed cooled battery cups from the spindles 142, this being the last operation of the automatic battery cup machine, will now be described. An upright or vertically arranged ejecting plunger having an upper part 180 and a lower part 181 is guided in its upper part 180 by a bearing 182 on the frame of the machine and its lower part 181 is bifurcated at the lower end and is there guided by the sleeve hereinbefore described which surrounds the cam shaft 146 and integrally connects together the plunger-operating cam 145 and the operating cam 170 for the cleansing and soldering devices, as is shown in the drawings, particularly in Figs. 39 and 41. The ejecting plunger, having the upper part 180 and the lower part 181, is positively operated in its cup-ejecting movement by the cam 145 which engages, as shown, a cam roller at the back of the bifurcated bar 181 of the cup-ejecting plunger, this cam 145 being the one which also operates the loading plunger 140, as hereinbefore described. At its upper end the upper part of the ejecting plunger 180 is provided with a block or head 183 which upon its side toward the rear end of the machine carries, by means of an attaching bolt as shown, a downwardly projecting ejector claw 184 which at its back is reinforced by a bent leaf spring 185 shown as attached to the head block 183 by the same bolt by which the ejector claw 184 is attached. The lower end of the ejector claw 184 projects horizontally toward the front end of the machine and is provided with a semi-circular notch for engaging beneath the lower open end of an inverted battery cup on the uppermost spindle 142, in its lower position appearing in the drawings, excepting in Fig. 39, where the cup is slightly raised. The engaging end of the ejector claw 184 lies in the path of an advancing spindle 142 in position to engage beneath the open end of an inverted cup as the completed cup is moved upward and rearward by the rotation of the turret 143 so that the turret will come to rest with the notched end of the ejecting claw 184 in engagement with the cup which is to be next ejected. During such periods of rest of the turret 143 the two-part ejecting plunger is raised by the cam 145 thereby raising the ejecting claw which pulls the cup upward from the spindle. When the completed cup leaves the upper end of the spindle it is thrown or pushed forward toward the front end of the machine by the resiliency of the ejecting claw 184 and its reinforcing spring 185 and is caught by a delivery spout 186 from which it drops and may fall into any suitable receptacle placed at the side of the machine. After a completed and cooled battery cup has been thus ejected, the ejecting plunger and its adjuncts or parts carried thereby including the ejecting claw 184 are returned to the lower or engaging position partly by reason of their own weight and partly and more surely by means of a coiled return spring 187 housed within the tubular upper part 180 of the ejecting plunger and acting between the plugged lower end of such tubular part and a stationary plug held by a screw pin 188 which passes through a slot in the tubular plunger part 180, as shown in Fig. 41.

The rotative movement of the split resilient cup-carrying spindles 142 serves a plurality of purposes, at least four in number. This rotation of the spindles 142, which has been hereinbefore fully described, results in or imparts a spiral or twisting movement to the incomplete cups as they are pushed over the ends of the spindles by the loading plunger 140 and also imparts a similar spiral or twisting movement to the completed cups as they are removed from the spindles by the ejecting claw 184 so that the rotation of the spindles makes such loading and ejecting easier, as is well understood, that is to say, it is easier to push the cup over the rotating spindle and to remove it therefrom than if such spindle is not rotated; also such rotation of the cup-carrying spindles 142 results in the even applying and spreading of the acid and of the solder to the bottom joint by the acid-applying and solder-applying devices, as will be clearly understood.

The operation of the machine has been quite fully explained along with the above description of its construction and there does not seem to be anything to be added to this other than a few general explanations. It might be noted, for example, that all of the several operating shafts of the machine rotate at the same speed, that is to say, the cam shaft 146, the cam shaft 114, the longitudinal cam-carrying shaft 17, the turret-operating shaft 155 and the main shaft 26 are all geared to rotate together at the same speed, and that for each complete or single rotation of these shafts one complete operation of the entire machine takes place, a plurality of the cup making operations taking place at the same time at different places or stages, as hereinbefore particularly described. For example, to trace the operation backward through the machine and assuming that the completed cup which is being ejected to be the first one made by the machine and therefore number one, it will be noted that while cup number one is moving forward to the ejecting position and being ejected that cups number two, three and four are being subjected to the final cooling operation; number five is being soldered at the bottom seam; number six is having the cleansing acid applied to the bottom seam; number seven is being pushed from the lower end of the chute 131 over an alined turret spindle; numbers eight to eighteen inclusive are contained in the chute 131 (in the machine illustrated in the drawings); number nineteen is moved forward to the terminal position on the horn 51 and has a bottom blank inserted and positioned therein; numbers twenty to twenty-three inclusive are being subjected to the first cooling operation on the horn 51; number twenty-four is moved forward and has the solder applied to the side seam thereof; number twenty-five is idle on the horn 51 between the cleansing and soldering operations; number twenty-six has acid applied to its side seam as it moves forward; number twenty-seven has the second and third forming operations performed by which it is formed into an open ended tube around the horn 51; number twenty-eight is subjected to its first forming operation in which the opposite edges of a flat blank are turned over to a shorter curve than that of the completed cup; and number twenty-nine is pushed forward by the strip-feeding devices and severed from the end of the zinc strip 1 by the shearing devices, these feeding and shearing operations both taking place during one cycle of operation of the machine. It will be noted that aside from or in addition to what may be called the minor or subjective operations of the machine, such for example as the feeding, guiding, cooling, loading, ejecting, et cetera, the machine performs ten major positive operations, namely, first, shearing; second, first forming; third, second forming; fourth, third forming; fifth, applying acid to the side seam; sixth, soldering the side seam; seventh, inserting a bottom blank; eighth, positioning the same; ninth, applying acid to the bottom seam; and tenth, soldering the bottom seam; and also incidentally performs the four intermediary minor operations of feeding forward the strip 1 to the shearing device, of feeding forward the blanks and tubes along the bed plate 5 and the horn 51, of loading the incompleted cups on the turret spindles 142, and of ejecting the completed cups from the turret spindles and from the machine. It is to be noted in this connection that the capacity or output of the machine of my invention illustrated in the drawings is from seventy to seventy-five complete battery cups per minute.

It is obvious that various modifications may be made in the construction shown in the drawings and above particularly described within the principle and scope of my invention.

I claim:

1. A cup making machine comprising a first pair of formers for bending over two opposite edges of a flat sheet metal body blank toward the same side of the blank on a curve, a second pair of formers for bending the blank in the same direction at its middle on a curve, a third pair of formers for closing together the inturned edges of the blank to form a cylindrical body tube, supporting means for the blank coöperative with the formers, means for cleansing and soldering the side seam, means for inserting and positioning a sheet metal bottom disk at the inside of one end of the soldered body tube, means for cleansing and soldering the seam around the bottom disk at the end of the tube, and means for automatically operating in proper sequence all of the said parts of the machine.

2. A cup making machine comprising a first set of forming devices for bending over two opposite edges of a sheet metal blank in the same direction, a second set of forming devices for bending the blank at its middle toward the bent over edges, a third set of forming devices for closing together the inturned edges of the blank in overlapping relation to form a tube, cleansing means for cleansing the surfaces at the overlapped seam, soldering means for sealing the overlapped seam, bottom-inserting means for inserting a metallic bottom blank at an oblique angle into one end of the tube, bottom-positioning means for bringing the bottom blank to correct transverse position in the end of the tube, other cleansing means for cleansing the surfaces at the bottom seam, and other soldering means for sealing the bottom seam.

3. A cup making machine comprising feeding means for intermittently feeding forward a strip of sheet metal, a shearing device for cutting blanks from the end of the metal strip, a first set of forming devices for bending over two opposite edges of the blank in the same direction, a second set of forming devices for bending the blank at its middle toward the bent over edges, a third set of forming devices for closing together the inturned edges of the blank in overlapping relation to form a tube, cleansing means for cleansing the surfaces at the overlapped seam, soldering means for sealing the overlapped seam, bottom-inserting means for inserting a metallic bottom blank at an oblique angle into one end of the tube, bottom-positioning means for bringing the bottom blank to correct transverse position in the end of the tube, other cleansing means for cleansing the surfaces at the bottom seam, other soldering means for sealing the bottom seam, feeding devices for moving the blanks and uncompleted cups forward through the machine, an ejecting device for discharging the completed cups from the machine, and coördinating connections for assuring the proper timed sequence of operation of the several said parts of the machine.

4. A cup making machine having, in combination, a first pair of formers for bending over two opposite edges of a flat sheet metal body blank toward the same side of the blank on a curve, a second pair of formers for bending the blank in the same direction at its middle on a curve, a third pair of formers for closing together the inturned edges of the bent blank in overlapping relation to form a body tube having overlapped edges, supporting means for the blank coöperative with the formers, and means for soldering the overlapped side seam of the body tube.

5. A cup making machine comprising feeding means for intermittently feeding forward a strip of sheet metal, a shearing device for cutting blanks from the end of the metal strip, a first set of formers for bending over opposite edges of the blank, a stationary horn for receiving the blanks with bent over edges, a second set of formers for bending the blank around the horn, a third set of formers for closing together the inturned edges of the blank in overlapping relation to form a tube surrounding the horn, intermittently acting feed devices for moving forward the blank to the horn and the tube along the horn, cleansing means for applying a cleansing agent to the surfaces at the overlapped seam of the tube on the horn, sealing means for applying solder to the cleansed surfaces at the overlapped seam of the tube on the horn, bottom-inserting means for inserting a metallic bottom blank edgewise at an oblique angle into the open end of the tube as it projects from the end of the horn, bottom-positioning means coöperative with the end of the horn for bringing the bottom blank to correct transverse position in the end of the tube, a turret having projecting spindles, means for imparting step by step rotation to the turret, loading means for pushing an incomplete cup over a spindle of the turret, other cleansing means for applying a cleansing agent to the surfaces at the bottom seam of the incomplete cup on the turret spindle, other sealing means for applying solder to the cleansed surfaces at the bottom seam of the incomplete cup on the turret spindle, and an ejecting device for removing the completed cup from the turret spindle.

6. A cup making machine, having in combination, bottom-inserting means for inserting a metallic bottom blank at an oblique angle into the open end of a metallic tube, bottom-psitioning means for bringing the bottom blank to correct transverse position in the end of the tube, and sealing means for soldering the bottom blank in place to produce the completed cup.

7. A cup making machine having, in combination, bottom-inserting means for inserting a metallic bottom blank at an oblique angle into the open end of a metallic tube, bottom positioning means for bringing the bottom blank to correct transverse position in the end of the tube, a turret having projecting spindles, means for imparting step by step rotation to the turret, loading means for pushing a tube with the bottom blank therein over a spindle of the turret, cleansing means for applying a cleansing agent to the surfaces of the tube and bottom blank at the bottom seam while the tube is on the turret spindle, sealing means for applying solder to the cleansed surfaces at the bottom seam with the tube on the turret spindle, and an ejecting device for removing the completed cup from the turret spindle.

8. A cup making machine having, in combination, a stationary shearing jaw, a movable shearing jaw coöperating with the stationary shearing jaw to cut blanks from the end of a sheet metal strip, supporting means for receiving the blank, a pair of fixedly spaced forming jaws movable together for bending over two opposite edges of the blank toward the same side of the blank on a curve, a stationary horn for receiving the blank with bent over edges, a second pair of more closely fixedly spaced forming jaws movable together for bending the blank around the horn, feed devices for moving the sheared blanks successively into register with the first and second pairs of forming jaws, and a movable head upon which all of the said jaws are mounted so that the shearing and the two said forming operations are all performed at the same time upon separate blanks.

9. A cup making machine having, in combination, a stationary shearing jaw, a movable shearing jaw coöperative with the stationary shearing jaw to cut blanks from the end of a sheet metal strip, supporting means for receiving the blank, a pair of fixedly spaced forming jaws for bending over two opposite edges of the blank, a stationary horn for receiving the blank with bent over edges, a second pair of more closely fixedly spaced forming jaws for bending the blank around the horn, feed devices for moving the sheared blanks successively into register with the first and second pairs of forming jaws, a reciprocating head upon which the movable shearing jaw and the two pairs of forming jaws are fixedly mounted to move therewith, and spring-pressed pressers carried by reciprocating the head for holding the blanks down upon the supporting means and upon the horn during the two said forming operations.

10. A cup making machine having, in combination, a stationary shearing jaw, a movable shearing jaw coöperative with the stationary shearing jaw to cut blanks from the end of a sheet metal strip, supporting means for receiving the blank, a pair of fixedly spaced forming jaws for bending over two opposite edges of the blank, a stationary horn for receiving the blank with bent over edges, a second pair of more closely fixedly spaced forming jaws for bending the blank around the horn, feed devices for moving the sheared blanks successively into register with the first and second pairs of forming jaws, a reciprocating head upon which the movable shearing jaw and the two pairs of forming jaws are fixedly mounted to move therewith, spring pressed pressers carried by the head for holding the blanks down upon the supporting means and upon the horn during the two said forming operations, and a pair of oppositely moving gripping jaws for forming the blank into a tube around the horn.

11. A cup making machine having, in combination, a tube-supporting and guiding horn, means for feeding the tubes along and pushing them from the end of the horn, a chute through which the tubes descend from the horn, and a gate for the lower end of the chute controlled by the movement of the tubes on the horn.

12. A cup making machine having, in combination, a tube-supporting and guiding horn, means for feeding the tubes along the horn, bottoming devices for inserting and positioning a bottom blank within the projecting end of a tube at the end of the horn, sealing devices for soldering the bottom blank in place in the tube, a chute through which the tubes descend from the horn to the sealing devices, a gate controlling the delivery of tubes from the chute, and operating means for the gate controlled by the movement of the tubes on the horn.

13. A cup making machine having, in combination, a tube-supporting and guiding horn, means for feeding the tubes along the horn, a bottom-inserting device for inserting a bottom blank into the open end of a tube as it projects from the end of horn, and a controlling device in control of the bottom-inserting device and controlled by the tube on the horn so that the bottom-inserting device is rendered non-operative should there be no tube on the horn.

14. A cup making machine having, in combination, a turret, means for imparting step by step rotation to the turret, a rotative spindle projecting from the turret, means for rotating the spindle, loading means for pushing a metallic tube containing a bottom blank in one end over the rotating spindle of the turret during a period of rest in the intermittent rotation of the turret so that the tube will rotate with the spindle, cleansing means for applying a cleansing agent to the seam at the bottom end of the rotating tube on the rotating spindle during another period of rest in the intermittent rotation of the turret, sealing means for applying solder to the cleansed surfaces at the bottom seam of the rotating tube on the rotating spindle during another period of rest of the turret, and an ejecting device operative at another period of rest of the turret for removing the completed cup from the rotating spindle.

15. A cup making machine having, in combination, a turret, means for imparting step by step rotation to the turret, a plurality of rotative spindles projecting from the turret, means for rotating the spindles, loading means for pushing bottom-containing metallic tubes over the rotating spindles during the periods of rest of the turret, cleansing means for applying a cleansing agent to the seam at the bottom of each rotating tube during the periods of rest of the turret, sealing means for applying solder to the cleansed surfaces at the bottom seam of each rotating tube during the periods of rest of the turret, an ejecting device for removing the completed cups from the rotating spindles during the periods of rest of the turret, and means for operating the loading means and the cleansing means and the sealing means and the ejecting device all at the same time during each period of rest of the intermittently rotating spindle-carrying turret.

16. A cup making machine having, in combination, a tube-supporting and guiding horn, means for feeding the tubes along the horn, a bottom-inserting device for inserting a bottom blank into the open end of the tube as it projects from the end of the horn, a bottom-positioning plunger engageable with the projecting end of the tube and with the bottom blank for positioning the bottom blank in the tube against the end of the horn, and a yieldable back stop for the tube for permitting it to slide back along the horn before the advancing bottom-positioning plunger.

17. A cup making machine having, in combination, a tube-supporting and guiding horn, means for feeding the tubes along the horn, a bottom blank magazine open at its lower end, a reciprocating feed blade for pushing a bottom blank from the lower end of the magazine into the open end of a tube as it projects from the end of the horn, a bottom-positioning plunger for positioning the bottom blank in the tube against the end of the horn, a movable guide coöperative with the feed blade for preventing displacement of the bottom blank carried by the feed blade, and means for retracting such guide out of the path of the bottom-positioning plunger and for returning it to the guiding position.

18. A cup making machine comprising forming means for bending a blank into a tube having overlapped edges, means for soldering the overlapped side seam, means for inserting a bottom blank at an inclination into one end of the tube, means for positioning the bottom blank in the end of the tube, and means for soldering the seam around the bottom blank at the end of the tube.

19. A cup making machine comprising first forming means for bending over two opposite edges of a blank in the same direction on a curve less than the circumferential curve of the completed cup, second forming means for bending the blank in the same direction at its middle and outwardly therefrom, third forming means for closing together the inturned edges of the blank to form a cylindrical tube, side-sealing means for sealing the side seam at the closed edges, bottom-inserting means for inserting a bottom disk at an angle into one end of the sealed tube, bottom-positioning means for straightening and positioning the bottom disk in the end of the tube, and bottom-sealing means for sealing the bottom seam between the bottom disk and the end of the tube.

20. A cup making machine comprising first forming means for bending over two opposite edges of a blank in the same direction on a curve, second forming means for bending the blank in the same direction at its middle and outwardly therefrom, third forming means for closing together the inturned edges of the blank in overlapping relation to form a tube, means for soldering the overlapped side seam, bottom-inserting means for inserting a bottom disk at an angle into one end of the soldered tube, bottom-positioning means for straightening and positioning the bottom disk in the end of the tube, and means for soldering the seam around the bottom disk at the end of the tube.

21. A cup making machine comprising shearing means for cutting a blank from the end of a sheet metal strip, first forming means for bending over two opposite edges of the blank in the same direction, second forming means for bending the blank in the same direction at its middle and outwardly therefrom, third forming means for closing together the inturned edges of the blank in overlapping relation to form a tube, means for applying a cleansing agent to the surfaces along the seam at the overlapped edges, means for applying solder to the cleansed surfaces along the overlapped seam, means for holding together the soldered edges of the tube until it cools sufficiently for the solder to hold, bottom-inserting means for inserting a bottom disk edgewise at an oblique angle into one end of the soldered tube, bottom positioning means for straightening and positioning the bottom disk in the end of the tube, means for applying a cleansing agent to the surfaces along the bottom seam between the bottom disk and the end of the tube, means for applying solder to the cleansed surfaces along the bottom seam, means for permitting the completed cup to cool undisturbed sufficiently for the solder to hold the bottom in place, and ejecting means for discharging the completed cooled cup from the machine.

22. A cup making machine having, in combination, a first pair of fixedly spaced forming jaws movable together for bending over two opposite edges of a flat sheet metal blank toward the same side of the blank on a curve, a second pair of more closely fixedly spaced forming jaws movable together for bending the blank in the same direction at its middle on a curve, a movable head upon which all of the said forming jaws are mounted for common concurrent movement so that the two said forming operations are performed at the same time upon separate blanks, a pair of oppositely moving gripping jaws for closing together the inturned edges of the bent blank in overlapping relation to form a body tube having overlapped edges, supporting means for the blank coöperative with the forming jaws and the gripping jaws, and means for soldering the overlapped side seam of the body tube.

In testimony whereof I have affixed my signature in presence of two witnesses.

SECONDO L. CASELLA.

Witnesses:
JOHN W. WALLER,
WM. ASHLEY KELLY.